Oct. 27, 1964
R. C. STRAUSS
3,153,943
STARTER CONTROL
Original Filed Oct. 8, 1951
10 Sheets-Sheet 1
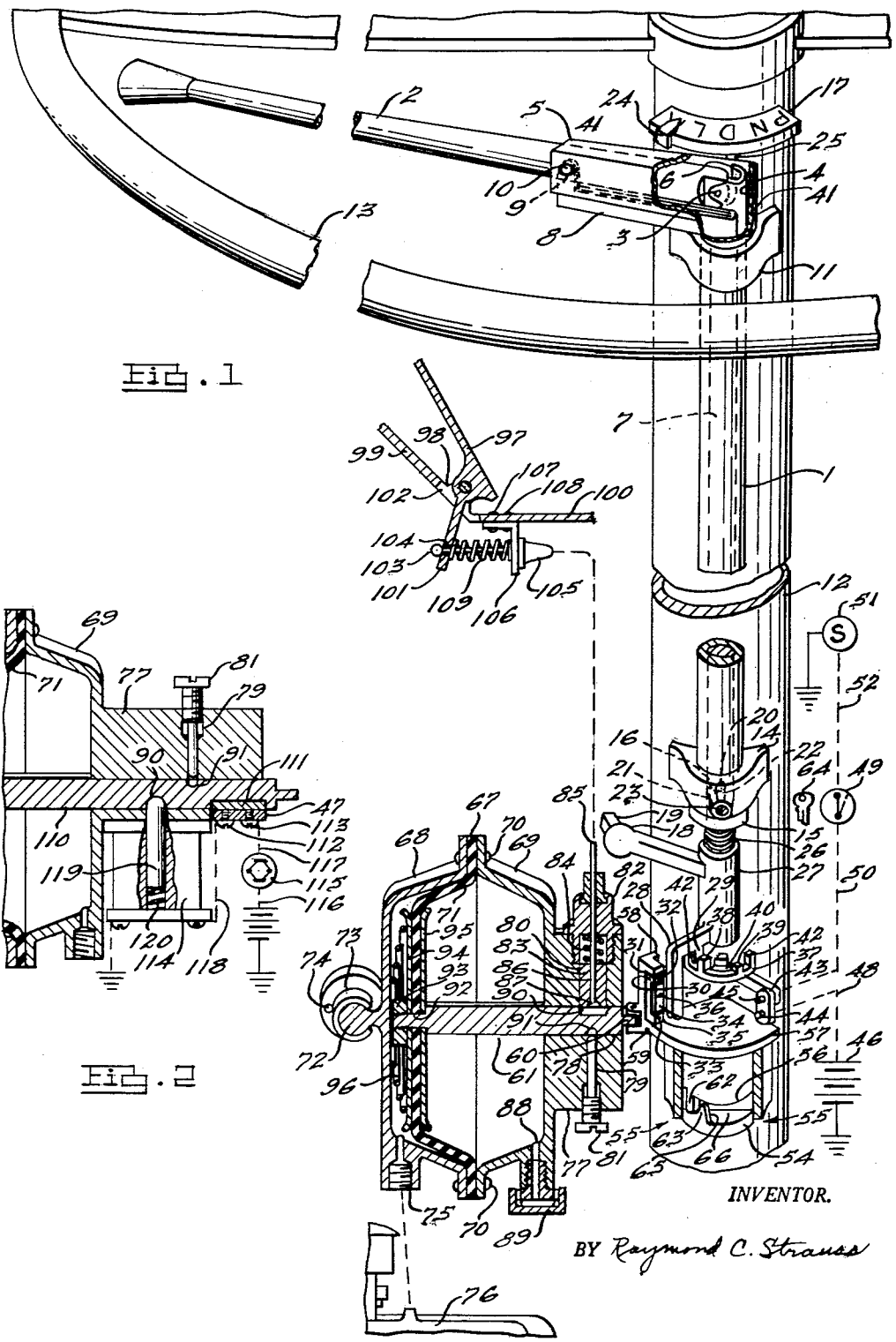
INVENTOR.
BY Raymond C. Strauss Oct. 27, 1964    R. C. STRAUSS    3,153,943
STARTER CONTROL
Original Filed Oct. 8, 1951    10 Sheets-Sheet 2
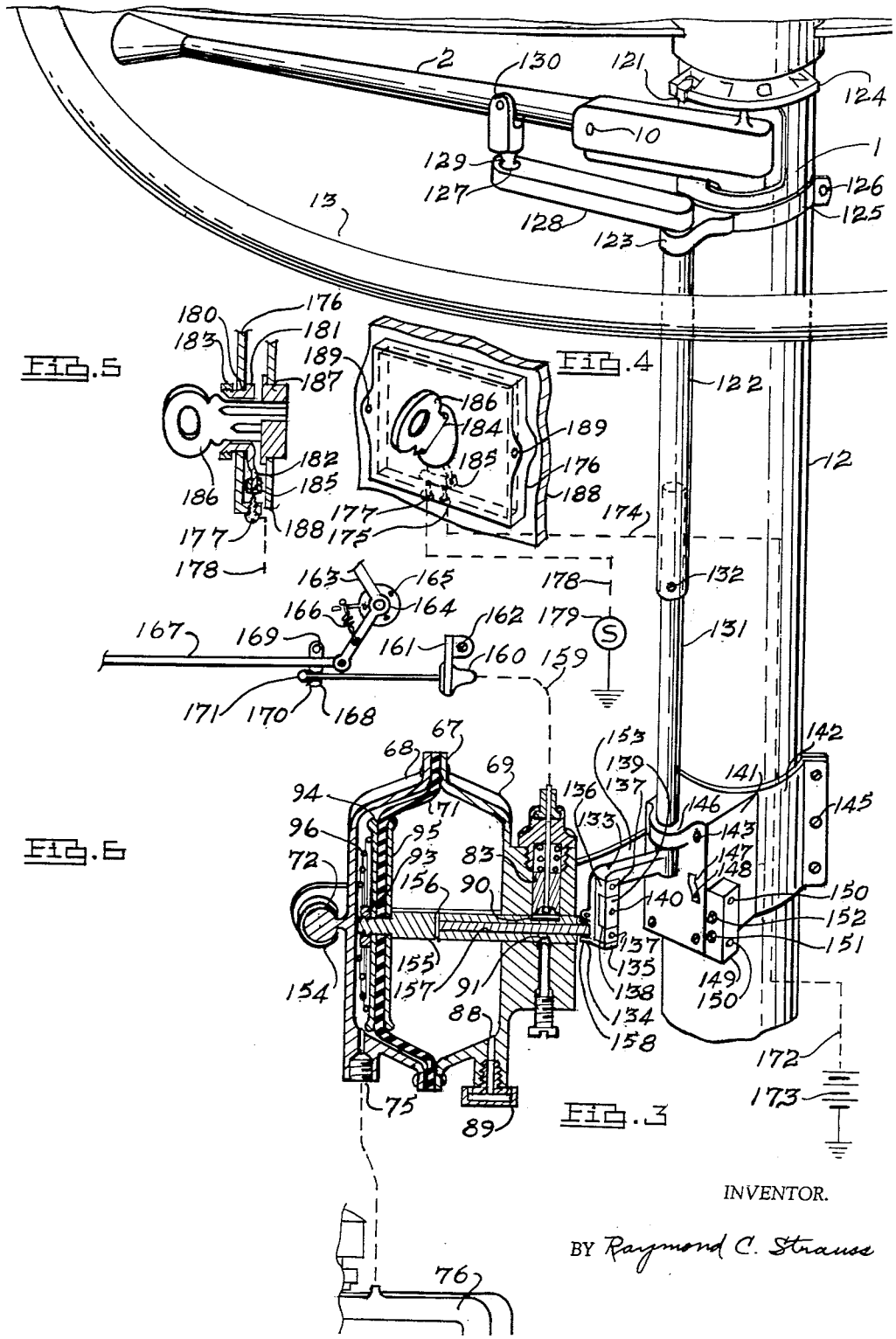
INVENTOR.
BY Raymond C. Strauss

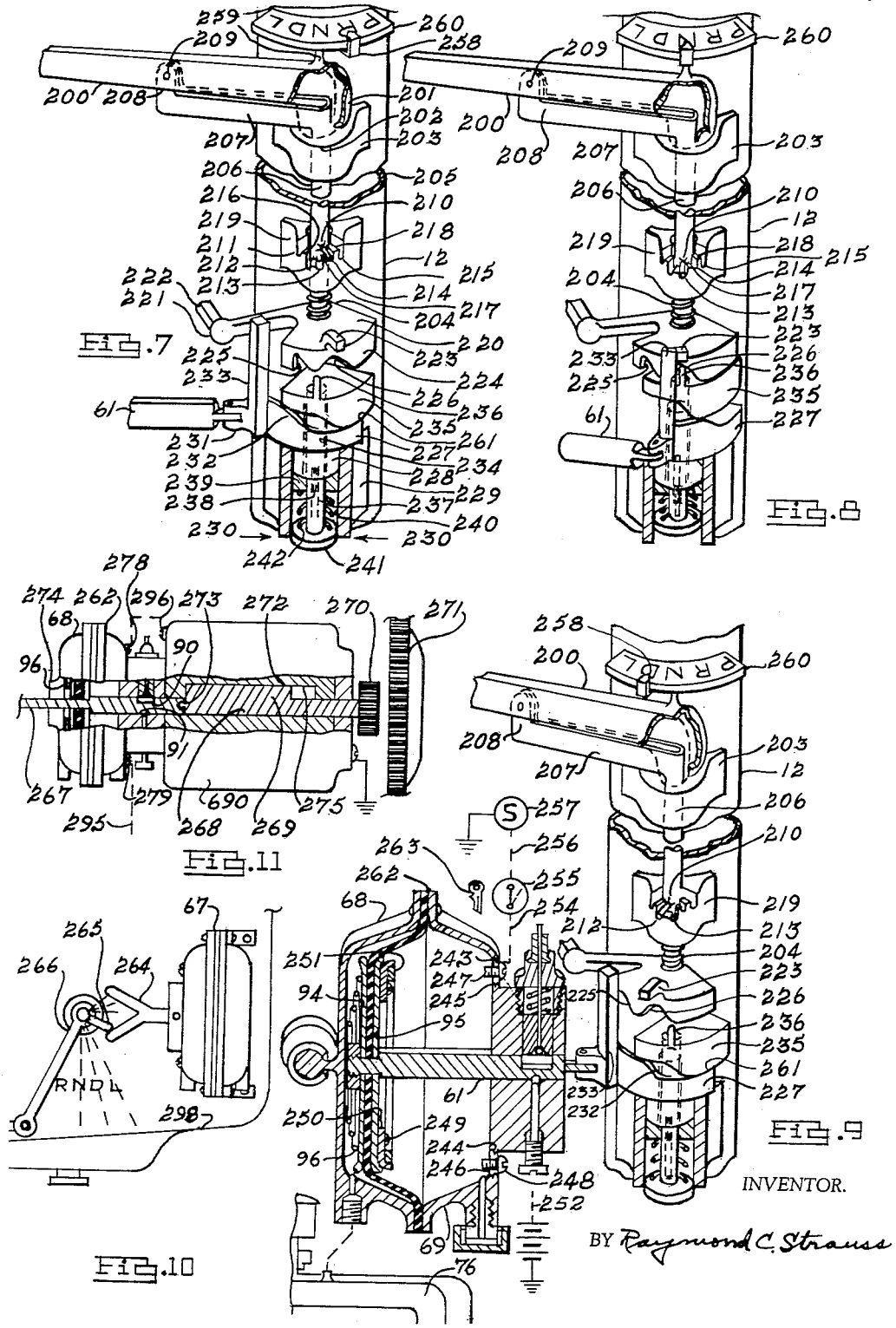

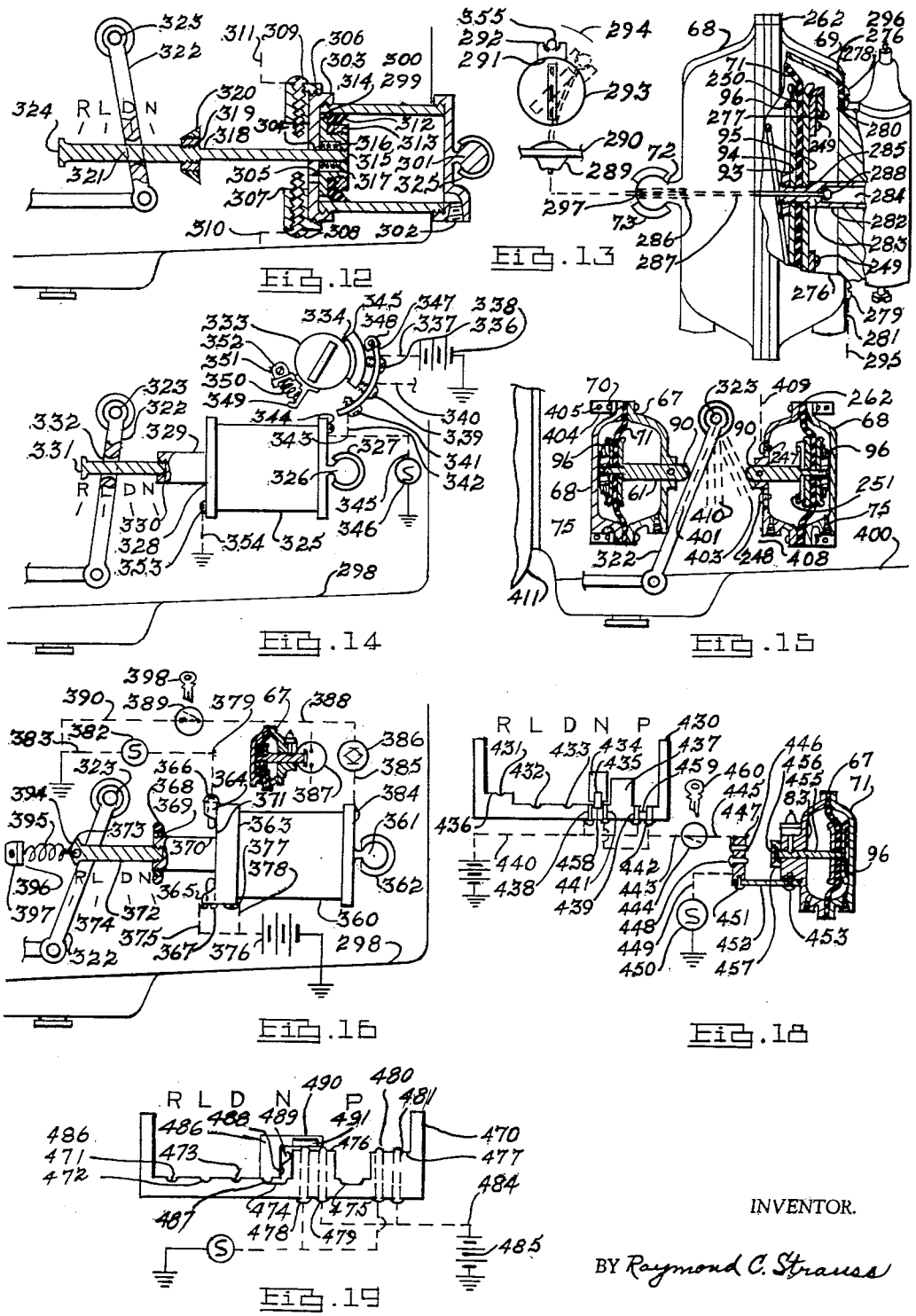

INVENTOR.
BY Raymond C. Strauss

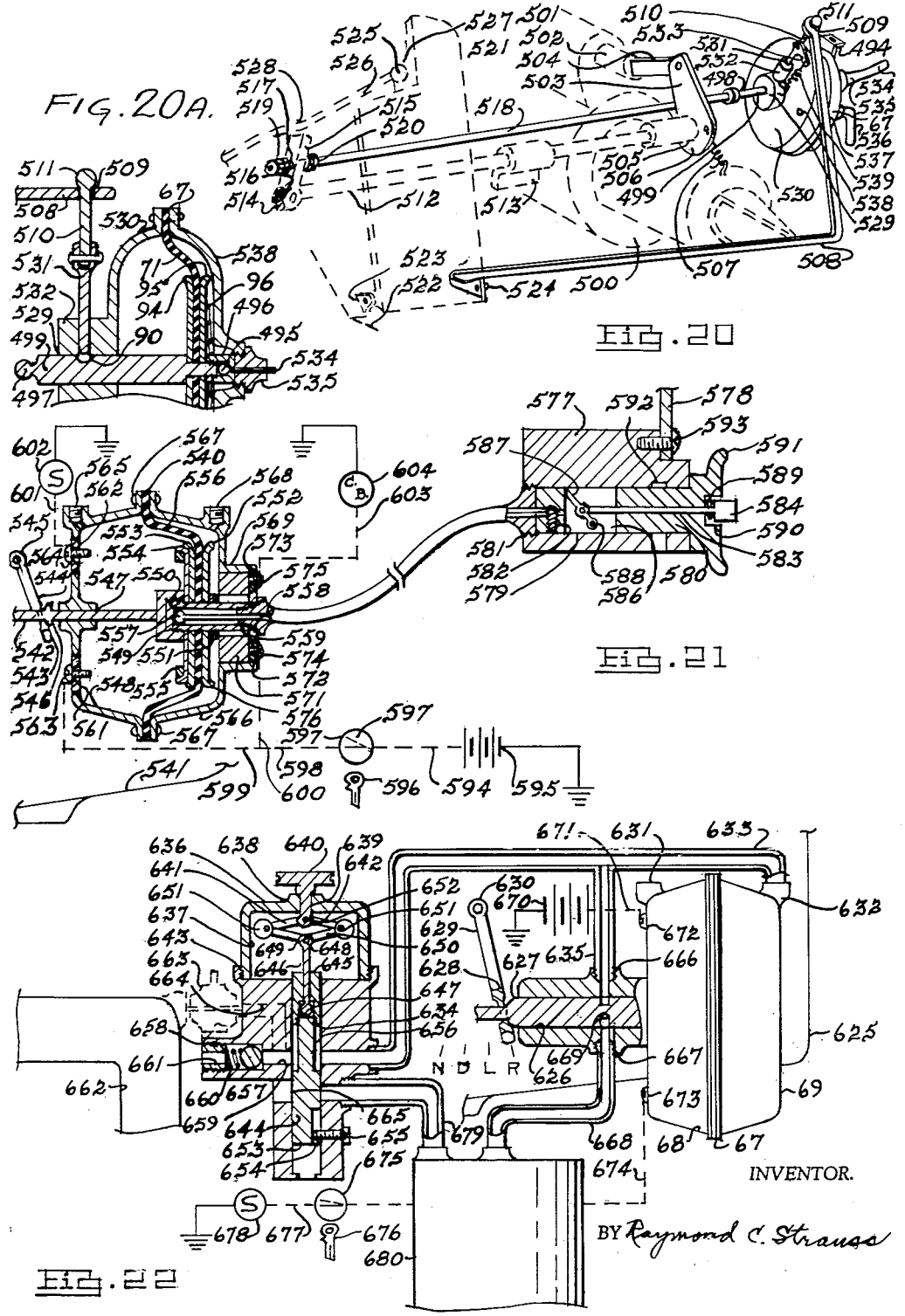

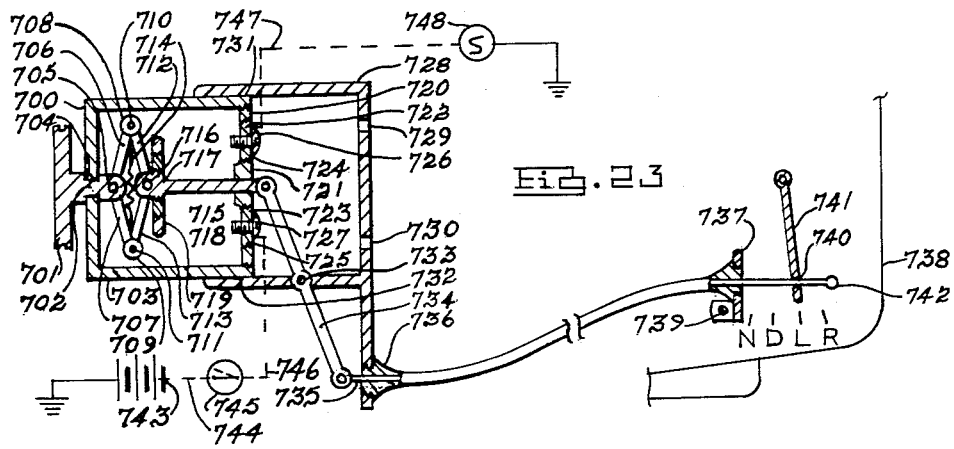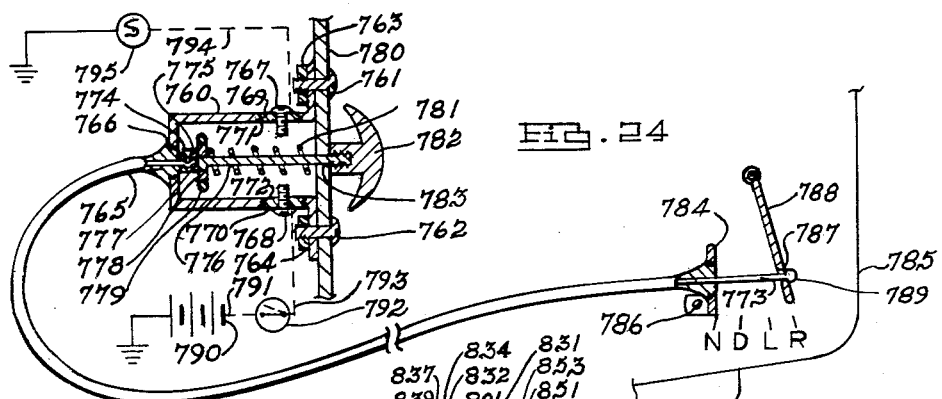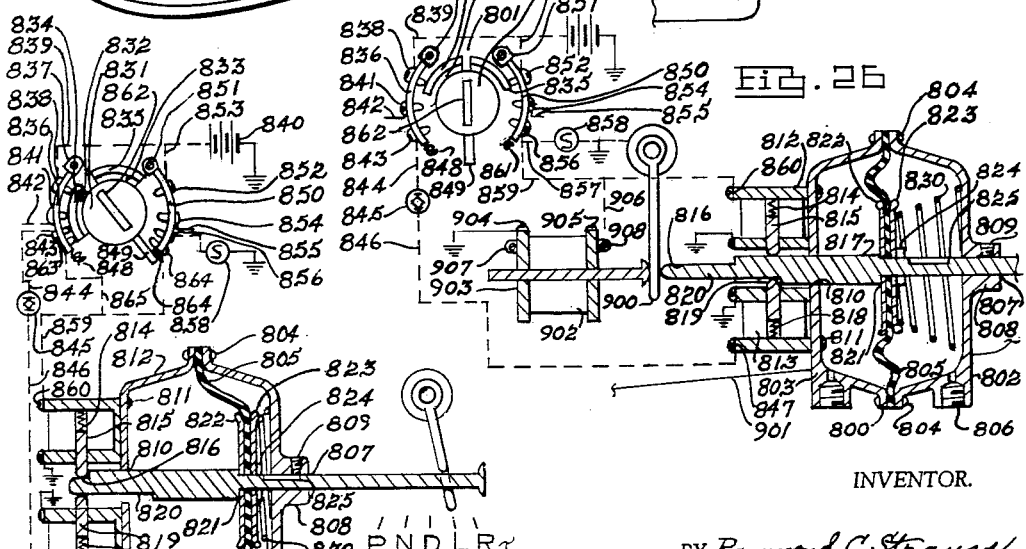

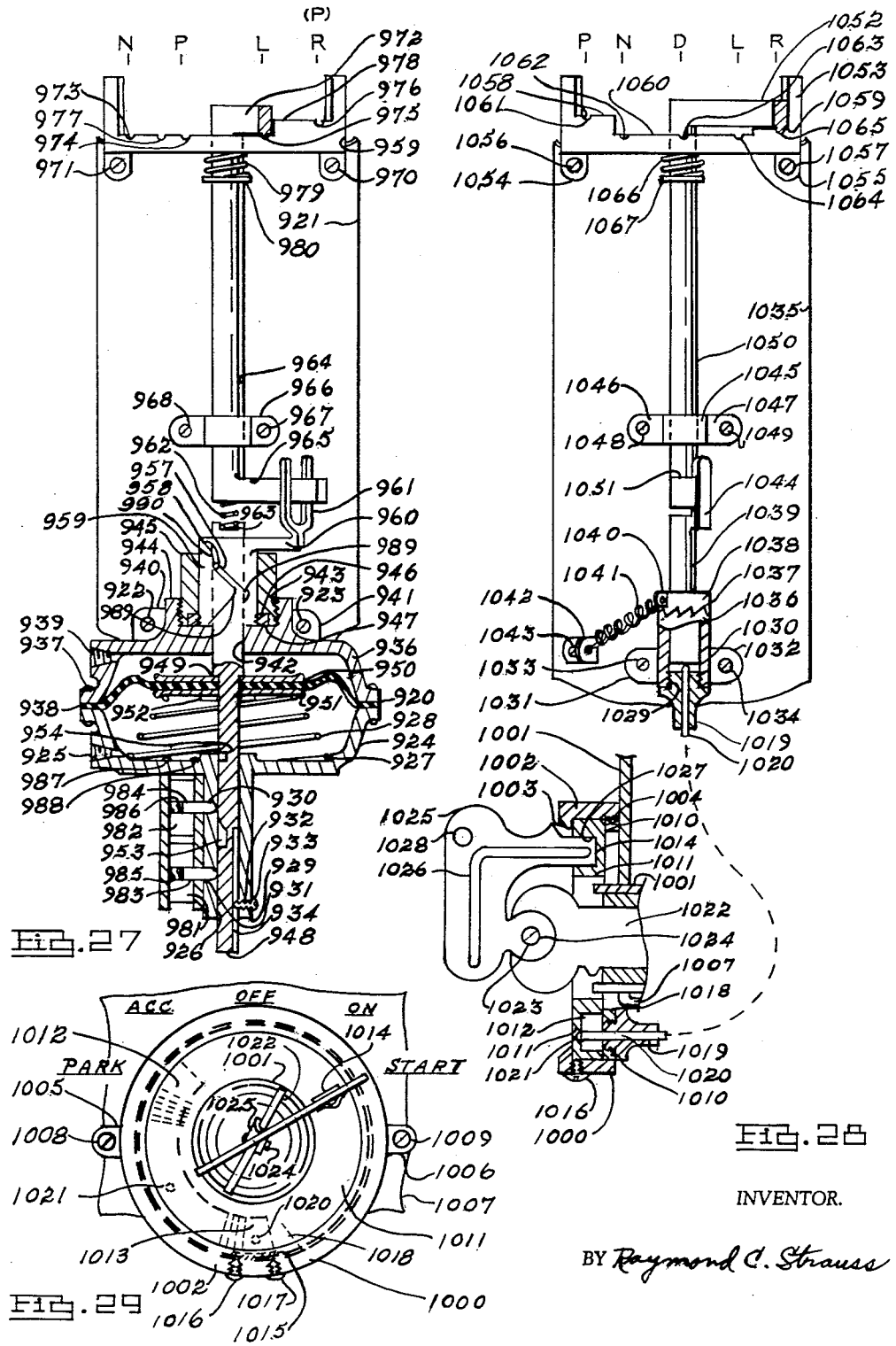

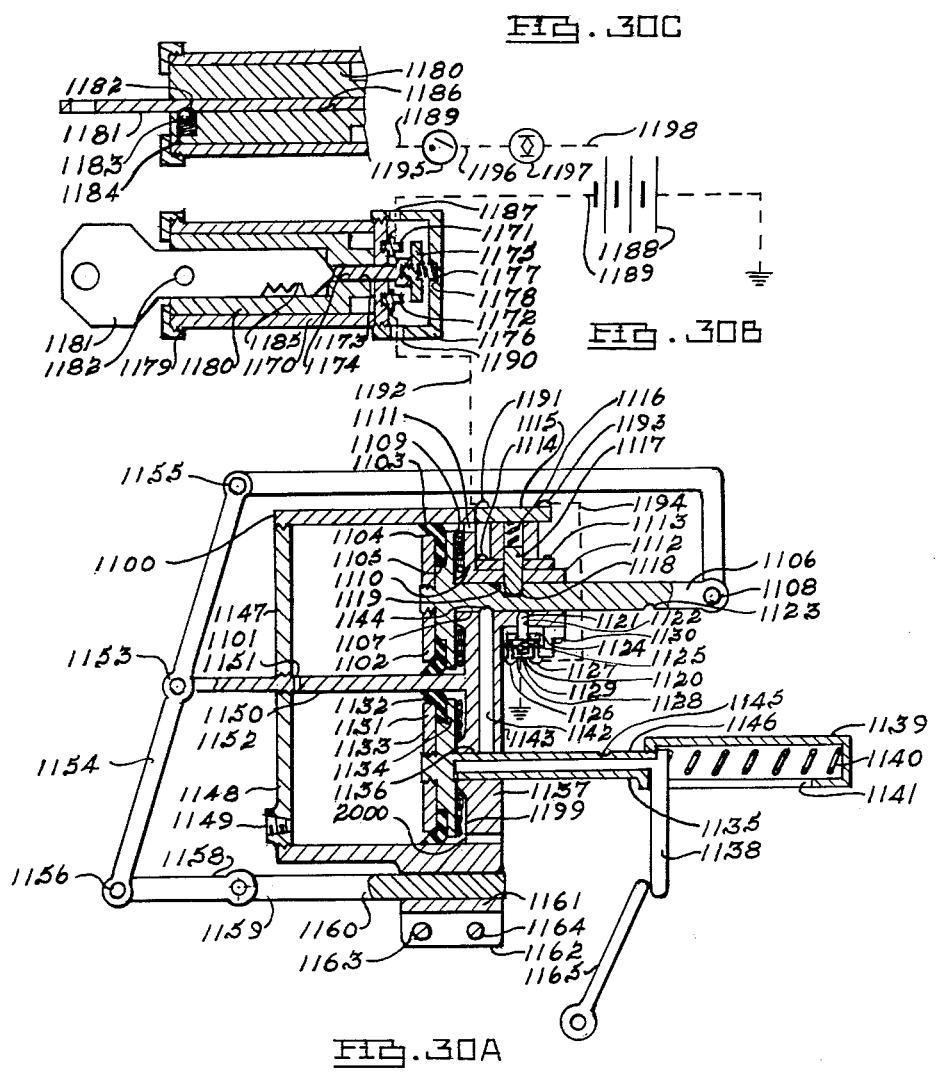

Oct. 27, 1964 R. C. STRAUSS 3,153,943
STARTER CONTROL
Original Filed Oct. 8, 1951 10 Sheets-Sheet 10
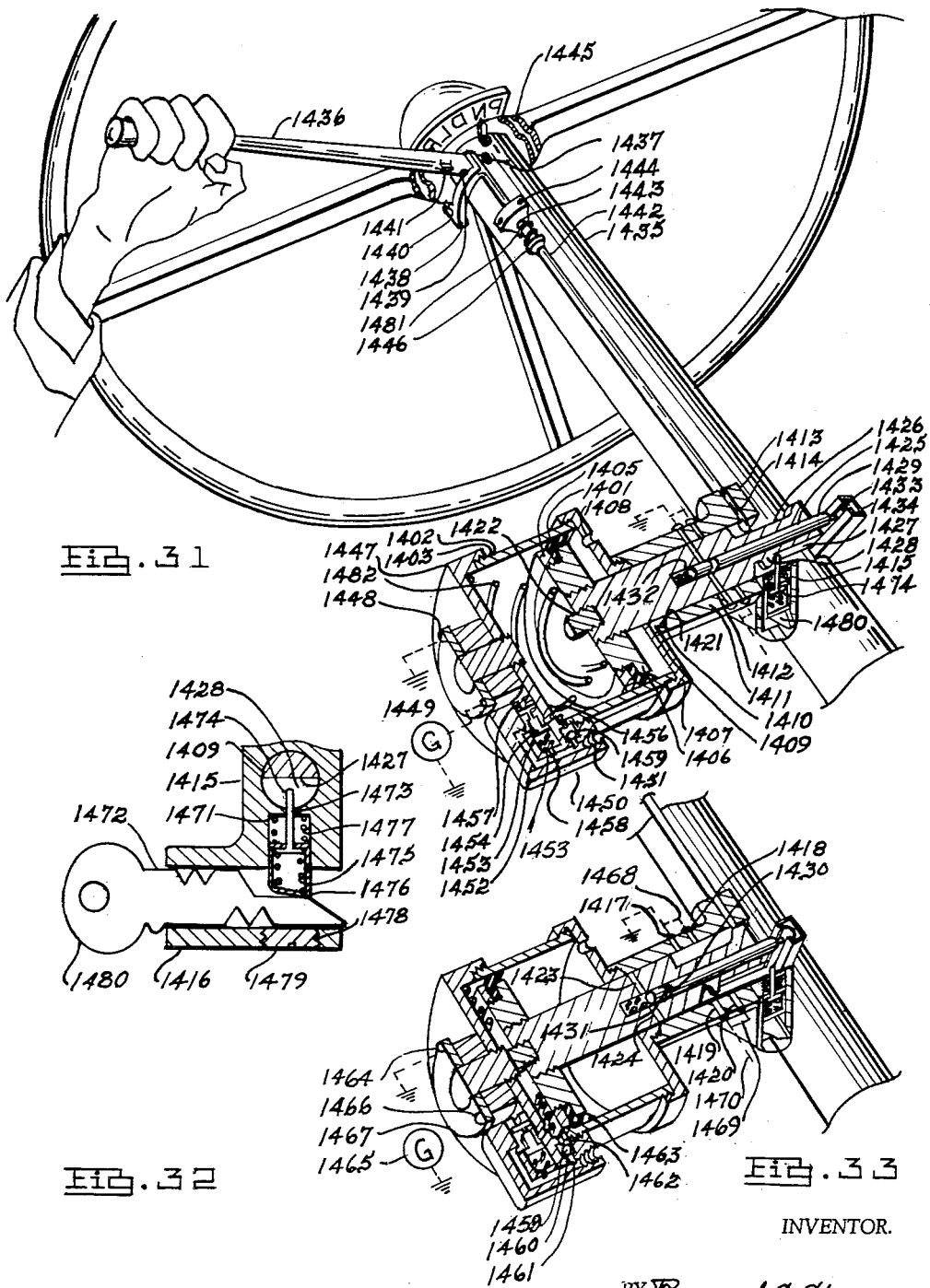
INVENTOR.
BY Raymond C. Strauss 3,153,943
STARTER CONTROL
Raymond C. Strauss, 933 S. Forest, Ann Arbor, Mich.
Original application Oct. 8, 1951, Ser. No. 250,334, now
Patent No. 3,035,563, dated May 22, 1962. Divided
and this application Oct. 21, 1955, Ser. No. 541,877
27 Claims. (Cl. 74—472)

This invention which is a division of my copending application Serial No. 250,334, filed October 8, 1951, now Patent No. 3,035,563, issued May 22, 1962, relates generally to motor vehicles having change speed transmissions and, in particular, to a device for positioning the transmission selector lever of a motor vehicle at an out-of-gear position for safe motor starting conditions. It also provides a method for starting the motor in an out-of-gear position upon the turning of the ignition key to "on," and further provides a method for combining these features so that the selector lever will be automatically or manually returned to the out-of-gear position before automatically or manually starting the motor.

It is well known that in operating a motor vehicle starting should be accomplished while the motor is out of gear. This precaution is especially important where automatic transmissions are used, since with in-gear starting they have the deceptive quality of seeming to be in neutral until the operator pumps the accelerator for motor warm-up with the result that the vehicle begins to move.

Many manufacturers, for this reason, employ a circuit breaking switch for the starter which permits starting only when the selector lever is moved to an out-of-gear position such as neutral or parking. Such an arrangement requires the driver to first manually shift out of gear and then press the starter button, usually a two-handed operation that frequently distracts and confuses the driver, especially in heavy traffic.

Certain types of semi-automatic starters partially alleviate this situation by combining, for example, the accelerator with the starter, the clutch with the starter, or the ignition switch with the starter, all of them, however, first requiring manual movement of the selector lever to an out-of-gear position.

One of the main objects of this invention is to provide a means for returning the selector lever automatically from an in-gear position to an out-of-gear position as soon as the motor stops.

Another object of this invention is to provide a means for returning the selector automatically from an in-gear position to an out-of-gear position and to combine it with a manual starter or an already built-in semi- or fully-automatic starter.

A further object of this invention is to provide the above-mentioned automatic return-to-neutral feature wherein the lever is locked out of gear with means for engaging the starter until the motor restarts, with the ignition "on," then to disengage said starter and unlock said selector for manual repositioning at an in-gear location.

Another object of this invention is to provide such a means which may be installed upon a vehicle as an accessory quickly and simply.

Another object of this invention is to provide such a means which may be built into the vehicle at the time of manufacture at one of several strategic locations upon the chassis.

A further object of one form of this invention is to provide a safe, out-of-gear condition as soon as the operator turns the motor "off," and to provide a closed starter circuit except for the ignition switch, so that by simply later turning the ignition switch "on" the motor will automatically start and the operator can safely warm the motor up by pumping the accelerator, it being possible at any time after restarting the motor to move the lever to an in-gear position.

A further object of this invention is to provide an automatic method for returning the selector lever to an out-of-gear position, lifting the lever where necessary in moving to the neutral position to clear safety detents, barriers, and terraces blocking the lateral path of the selector lever.

A still further object of this invention is to provide an automatic method for returning the selector lever from any in-gear position to an out-of-gear position in case the out-of-gear position lies between in-gear positions.

A further object of this invention is to provide an arrangement whereby the selector lever can be manually moved under motor-stalled conditions to an out-of-gear position, so that the starter will automatically be engaged to start the motor and subsequently disengaged, for manual return to an in-gear position.

A still further object of this invention is to provide an arrangement whereby the selector lever can be manually moved under motor-stalled conditions to an out-of-gear position through a lateral motion, such lateral motion manually engaging the starter when the selector lever arrives within the out-of-gear location, release of such lateral pressured motion breaking the starter circuit.

A still further object of this invention is to provide a means for locking out the automatic neutral starting mechanism so that if the driver wishes to keep the vehicle in gear for pushing to start the motor the selector lever will remain at all times at the position in which it has been placed.

Another object of this invention is to provide visual and even audible indication of motor stoppage through the automatic lateral movement of the shift lever to the neutral position, a definite advantage to the driver of a vehicle which has a quiet running motor.

Another object of this invention is to provide a manually motivated but automatically responding means for returning the shift lever to neutral position whenever the foot, clutch, hand or similarly operated manual starter is engaged.

Another object of this invention is to provide an automatic means, upon stopping of the motor, for moving the shift lever into "parking" position, whereupon, as soon as the vehicle speed drops to 2 or 3 miles per hour, a locking pawl, customarily built into this type of automatic transmission, locks the driving wheels against rotation, it being further possible to add the feature of restarting the motor automatically in this out-of-gear condition with subsequent freeing of the shift lever for in-gear positioning.

Another object of this invention is to provide a mechanism which will selectively position the shift lever at neutral or parking positions, after stopping of the motor, depending upon the positioning of the ignition key.

Another object of this invention is to provide a mechanism for first moving the shift lever to neutral before moving it to parking position, in the case where the parking position is located in the same position as adjacent to the reverse gear position.

Another object of this invention is to provide a manually loaded mechanism which will eject the shift lever from an in-gear to an out-of-gear position where the motor of the vehicle may be manually or automatically restarted.

Another object of this invention is to provide an automatic means for moving the shift lever when the motor stops to an out-of-gear position, at which position manual pressure upon the shift lever in either an in-gear direction or out-of-gear direction will complete the starter circuit for a motor restart.

Another object of this invention is to provide an automatic means for moving the shift lever when the motor stops to an out-of-gear position, at which position manual pressure upon the shift lever in either an in-gear or outof-gear direction will complete the starter circuit for a motor restart, along with further automatic means which, when the motor is stopped and the ignition switch is off, will cause the shift lever to move to the parking position, upon removal of the ignition key from the ignition switch.

Other objects and features of the invention will appear upon consideration of the drawings wherein like reference characters refer to like parts throughout the views:

FIGURE 1 is an overhead perspective view of one form of the automatic neutral starter, fluid pressure operated, with the selector lever assembly mounted on the steering column of the motor vehicle, a side view of a portion of the vehicle's manifold and carburetor mounted on the engine block, and a cross sectional view of the accelerator pedal with flexible shaft assembly interconnecting the pedal with fluid pressure assembly of the automatic neutral starter;

FIG. 2 is a cross sectional view of another type of fluid pressure assembly incorporating a governor controlled solenoid;

FIG. 3 is an overhead perspective view of an accessory form of the automatic neutral starter attached by universal means to the selector lever assembly of the vehicle through mounting on the steering column, and a side elevation of a portion of the vehicle's manifold and carburetor mounted on the engine block;

FIG. 4 is a perspective and somewhat diagrammatic view of an ignition switch mask showing transparently the electrical switch contacts used in one accessory form of the invention;

FIG. 5 is a cross sectional view through the perpendicular center of the ignition switch mask shown in FIG. 4;

FIG. 6 is a side elevational view of a portion of the usual accelerator linkage, and flexible shafting attaching thereto joining the accelerator linkage to the fluid pressure assembly of an accessory form of the invention;

FIG. 7 is a perspective view of another form of the invention wherein the reverse gear position of the automatic transmission is isolated from the other gear positions, the transmission being shown in reverse gear position and the mechanism being under motor-operating conditions;

FIG. 8 is an overhead perspective view of the form of the invention shown in FIG. 7, but with the selector lever shown to be in neutral position, the out-of-gear position, and the mechanism to be under motor-operating conditions;

FIG. 9 is an overhead perspective view of the form of the invention shown in FIGS. 7 and 8, but with the selector lever shown to be a drive-range position and the mechanism to be under motor-operating conditions, there being included a side elevational view of a portion of the motor's manifold and carburetor mounted on the engine block;

FIG. 10 is a side elevational view of an automatic transmission with the usual shift lever projecting through its side and the fluid pressure motivating unit of the neutral starter mounted thereon along with suitable cooperating members;

FIG. 11 is a cross setcional view of the fluid pressure motivating unit of the neutral starter combined with the vehicle's starter, there being also shown a pinion gear and a fragment of the flywheel and ring gear of the vehicle not in cross section;

FIG. 12 is a side elevational view of an automatic vehicle transmission with another fluid pressure form of the automatic neutral starter superimposed thereon to engage the exposed shifter arm of the transmission;

FIG. 13 is a side elevation view, partially cut away, of another form of the fluid pressure motivating unit, along with a side elevation view of the vehicle's ignition switch adapted to cooperate with the fluid pressure unit;

FIG. 14 is a side elevation view of an automatic transmission with an electrical solenoid motivating unit for the automatic neutral starter mechanism superimposed thereon to engage the exposed shifter arm of the transmission, along with a side elevation view of the vehicle's ignition-starter switch adapted to cooperate with the solenoid unit;

FIG. 15 is a side elevation view of an H-gate, standard type transmission, with two fluid pressure type diaphragms in cross section superimposed thereon to engage the exposed shifter arm of the transmission;

FIG. 16 is a side elevation view of an automatic transmission with an electrical solenoid motivating unit for the automatic neutral starter superimposed thereon to engage the exposed shifter arm of the transmission, along with a choice of an automatic governor switch or automatic vacuum switch cut into the diagrammatically shown starter circuit interconnected with the solenoid circuit;

FIG. 18 is a side elevation view of a selector lever range cage and a cross sectional view of an automatic vacuum actuated switch in combination with a diagrammatic view of the starter circuit of the motor vehicle;

FIG. 19 is a side elevation view of a selector lever range cage with embedded electrical contact points in combination with a diagrammatic view of the starter circuit of the motor vehicle;

FIG. 20 is a perspective view of a vacuum operated neutral positioning mechanism for the shift lever in combination wtih a semi-automatic foot starter, the latter shown in dotted lines;

FIG. 20A is a cross-sectional view of the vacuum neutral positioning unit shown in FIG. 20;

FIG. 21 is a side elevation, cross-sectional view of a vacuum operated neutral positioning mechanism for the shift lever incorporating a holding coil along with an automatic motor restarting circuit, as well as a dash-mounted, manual control for withholding said mechanism from operation, if desired;

FIG. 22 is a side elevational view in partial cross-section of a governor controlled vacuum operated neutral positioning mechanism and restarting circuit;

FIG. 23 is a side elevation, cross-sectional view of a governor actuated neutral positioning mechanism and restarting circuit;

FIG. 24 is a side elevation, cross-sectional view of a manually actuated neutral positioning mechanism linked with a dash-mounted, manually operated starter;

FIG. 25 is a side elevation and cross-sectional view of a diaphragm actuated neutral and parking position mechanism along with a plan view of the ignition switch assembly used therewith;

FIG. 26 is a side elevation, cross-sectional view of a combination diaphragm and solenoid actuated neutral and parking position mechanism along with a plan view of the ignition switch assembly used therewith;

FIG. 27 is a side elevation, cross-sectional view of a diaphragm actuated neutral and parking position mechanism along with a plan view of the steering column of the vehicle and certain shuttle parts employed;

FIG. 28 is a side elevation, cross-sectional view of a ratcheting, manually loaded neutral and parking position mechanism along with a plan view of the steering column of the vehicle as well as a cross-sectional view of the customary ignition switch and an accessory form of tripping mechanism for returning the shift lever to neutral and parking positions;

FIG. 29 is a plan view of the tripping mechanism masking the ignition switch shown in FIG. 28;

FIG. 30A shows a cross-sectional view of a tandem piston mechanism for ejecting the shift lever to neutral and park positions along with an ignition key controlled switch for effecting such movement;

FIG. 30B is a fragmentary plan view in cross section of the ignition key assembly of FIG. 30A;

FIG. 30C shows an alternate arrangement of a portion of the electric circuit employed in FIG. 30A;

FIG. 31 is a perspective of an accessory-type shift lever assembly and neutral-park position mechanism in cross-section;

FIG. 32 shows in cross-section the ignition assembly portion of the neutral-park positioning mechanism of FIG. 31; and FIG. 33 shows in cross-section the neutral-park positioning mechanism of FIG. 31 in another operative position.

Figure 17A:
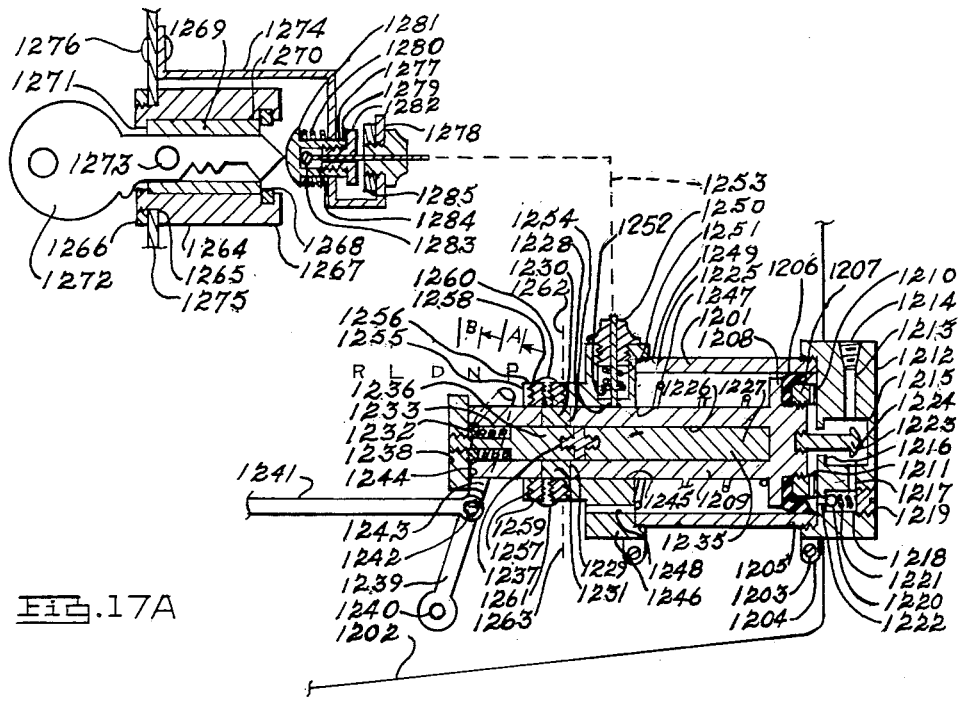
FIG. 17A is a cross sectional view of an hydraulic neutral-parking positioner combined with a manually operated starter control as well as a cross-sectional view of an ignition switch parking control assembly.

Referring now to the drawings for a more detailed description of the present invention and more particularly to FIG. 1 thereof, there is illustrated a conventional type of gear selector lever assembly generally designated at 1, employed in progressively selecting the reverse, low, and drive range of an automatic torque converter type of transmission as well as the neutral and park positions.

Assembly 1 employs a conventional shift lever 2, basically pivoted at bearing point 3 in shaft 4, firmly joined to masking hood 5, lever 2 entering shaft 4 at slit 6. Shaft 7, with arm 8 attached at its upper end, passes telescopically through shaft 4, the free extermity of 8 ending in an upwardly projecting elongated pivotal bearing 9 which pivots at 10 around lever 2 under hood 5 cut away at line 41—41, arm 8 also entering shaft 4 at slit 6. Lever assembly 1, by way of shaft 4, is carried near the top end in bearing housing 11, against the upper side of which the lower side of hood 5 bears frictionally. Housing 11, furthermore, is firmly welded to steering column 12, at the upper end of which is shown to be rotatably mounted steering wheel 13. Bearing housing 14, also firmly welded to steering column 12, carries lever assembly 1 at its lower end, there being threadably attached to the lower end of shaft 4 in assembly 1 a collar 15 to bear against the underside of bearing 14. The outer lower surface of shaft 7 has embedded elongated detents 16, collectively designated, in alignment with range selection positions shown on the selector quadrant 17 welded to steering column 12, the detents to register with ball 20 riding in drilled aperture 21 of bearing 14, and held pressed against shaft 4 by spring 22, threaded cap 23 cooperating with bearing 14 to confine spring 22 against ball 20.

Quadrant 17 displays the customary letters R, L, D, N, and P to designate reverse, low, drive, neutral, and park, moving pointer 24 being firmly affixed to hood 5 at point 25 for rotation by lever assembly 1. Spring 26 passes over the exposed projecting lower end of shaft 7 to bear against collar 15 and crank base 27 which caps the lower end of shaft 7 and carries downwardly projecting crank arm 28 with tooth 29 as well as ball-end shifter arm 18 connecting to transmission linkage 19. Crank arm 28 is in alignment with the set-back terrace of arm 58, later to be discussed in further detail, which carries the electrically non-conducting base 30 in countersunk area 31 through attaching screws 32 and 33, there being embedded in the base 30 electrical conducting plate 34 countersunk in area 35 of base 30 and attached to 30 by screw 36.

A range cage 37, having on its arcuate periphery laterally projecting barriers 38 and 39 along arcuate shoulder 40, is welded at its heel portion to steering column 12. It engages tooth 29 of arm 28 and limits the lateral movement of tooth 29 by means of bumper ends collectively numbered 42. Electrically non-conducting arm 43, firmly joined to range cage 37, projects perpendicularly from steering column 12, causing conductor screws 44 and 45, mounted in and projecting through 43, to stand in the path of and to contact plate 34 under conditions subseqeuntly to be described. Grounded battery 46 is connected to terminal screw 44 by lead 48, while switch 49, operated coincidentally with the ignition key 64, is connected to terminal screw 45 by lead 50, switch 49 joining through lead 52 to grounded starter 51.

Bearing housing 54, laterally cut away for illustrative purposes, at level 55—55, and welded firmly to column 12, encases bearing 56 to which is firmly affixed shuttle fan 57 at the outer extremity of which there projects the step-backed arm 58 referred to above and ears 59 for pivotal flexible engagement with tongue end 60 of shaft 61. Bearing 56 is formed with downwardly projecting cam tooth 62 for engagement with shoulder 63 projecting laterally from raceway 65 formed along the lower and inner end surface of bearing bore 66 in housing 54.

Diaphragm housing, generally designated as 67 and shown in cross section, is composed of shells 68 and 69, joined at their concave outer edges by rivets 70 and gripping therebetween the outer edges of diaphragm 71 to form a tightly-sealed enclosed area. At the center of the outer surface of shell 68 there is formed ball projection 72 which is carried in ball support 73 firmly mounted on the frame of the vehicle through cooperating bolts 74, shell 68 being apertured and threaded at 75 for fitting the tubing connection (shown in dotted lines) to manifold 76. Shell 69 has formed on its outer surface bearing housing 77 through which projects to the inner surface at the axial center bearing bore 78, from which radiate bores 79 and 80 to the outer cylindrical surface of 77. Bore 79, partially threaded from its outer end, receives partially threaded screw 81. Bore 80, partially threaded from its outer end, receives threaded flexible shaft housing 82, barrel 83, spring 84, and flexible shaft 85 which projects through drilled cut 86 of barrel 83 to be capped by ball end 87. Shell 69 is apertured and threaded at 88 to receive air cleaner 89.

A detent 90 is recessed in the surface of shaft 61 to receive barrel 83. Another detent 91 is also formed on the surface of shaft 61 to receive the inwardly projecting end of screw 81. Shaft 61 at the end adjacent shell 68 carries smaller diameter threaded projection 92 on which nut 93 grips dished plate 94, diaphragm 71, and dished plate 95. Spring 96 bears expandably against the inner surface of shell 68 and against the depressed surface of dished plate 94.

An accelerator pedal 97 is shown to be mounted by means of stanchion 98 on the inclined portion of floor board 99 of floor board 100 within the driving compartment of the vehicle. Arm 101 rigidly joined to pedal 97, projects through the inclined portion as well as the lower portion of the floor board by way of cut 102 to engage through slot 104 ball end 103 of flexible shaft 85 which enters housing 105 mounted on apertured bracket 106 carried under floor board 100 by rivets 107 and 108. Spring 109 passes over shaft 85 and bears expansibly against arm 101 and bracket 106 normally repressing 97 to the release position shown, shaft 85 connecting through the dotted lines shown with its lower ball end within barrel 83 inside bearing housing 77 of shell 69.

In the operation of the mechanism so far described, assuming the ignition key 64 and switch 49 to be "on" the motor of the vehicle is assumed to be in operation so that a vacuum condition exists within manifold 76, and via aperture 75 communicating therewith, has caused diagram 71 to be moved to the position shown compressing spring 96, rotating shuttle fan 57 upon its bearing 56 so that arm 58 is withdrawn to such position that arm 28 has been made free for manual positioning in the reverse gear location behind barrier 38. To allow tooth 29 to clear 38 in assuming this position, it has been necessary to lift lever 2 about pivot point 3, arm 8 following upwardly in elongated bearing 9 so that shaft 7, base 27 and arm 28 are raised, compressing spring 26, for clearance of barrier 38.

With the diaphragm 71 in the position shown in FIG. 1 downward pressure upon accelerator pedal 97, especially with the motor under heavy load, would cause a sudden drop in vacuum pressure within manifold 76 permitting spring 96 to expand and force diaphragm 71 away from shell 68. Instead, with the construction as shown, downward accelerator pressure compressing spring 109 permits spring 84 to expand with the downward movement of flexible shaft 85 so that barrel 83 falls into detent 90. This locks diaghragm 71 in the position shown until the accelerator is again released by which time vacuum has reaccumulated to withdraw barrel 83 from detent 90.

In the event the motor now stalls while the ignition switch remains "on," vacuum pressure within manifold 76 disappears. Instinctively, the operator pumps the accelerator to verify this condition, and in so doing momentarily withdraws barrel 83 from detent 90 so that spring 96 is free to expand and drive diaphragm 71 and shaft 61 away from shell 68. Or, if the governor controlled assembly of FIG. 2 is substituted for the accelerator controlled assembly of FIG. 1, the motor driven governor will stop, immediately closing the circuit from the grounded battery to the grounded solenoid 114, via lead 116, governor switch 115, lead 117, terminal screw 113, conductor plate 111 carried by shaft 110 which corresponds to shaft 61, terminal screw 112, and lead 118, so that core 119 will be lifted from detent 90 allowing shaft 110 of non-conducting material, urged by spring 96 to move diaphragm 71 toward shell 69, breaking the circuit by shifting plate 111 away from contact with screws 112 and 113 carried in housing-mounted non-conductor plate 47.

While FIG. 2 shows a solenoid locking means for the diaphragm, responsive to motor speed, it is also possible to innovate this design by making the locking means directly responsive to the governor, eliminating the solenoid and electrical components; or the locking means may be directly responsive to a piston operating from a constant source of fluid pressure, such as a vacuum or air pressure pump, or hydraulic pump, driven by the motor; or the solenoid, as shown, may even be directly excited by an electrical source created through the rotational motion of the motor, such as from the battery input lead from the generator.

Shuttle fan 57 and attached terraced arm 58 then rotate about bearing 56 toward crank arm 28. As the gap between 58 and 28 narrows, cam tooth 62 climbs cam shoulder 63, so that the lower end of crank arm 28, bearing on the upper face of shuttle fan 57, is forced upwardly by 57 to lift tooth 29 above barrier 38, at which point arm 58 on its set-back surface pressures upon crank arm 28 to drive 28 in a counterclockwise direction across the top of barrier 38 and down against arcuate shoulder 40 until 29 contacts the side of barrier 39, a position which centers indicator 24 on N of quadrant 17, at the same time bringing conductor plate 34 into frictional circuit closing contact with terminal screws 44 and 45. Inasmuch as switch 49 is in a closed position, starter 51 immediately restarts the motor to create vacuum in manifold 76 and draw diaphragm 71 and shaft 61 again toward shell 68, breaking the starter circuit in so doing and freeing arm 28 for in-gear manual positioning.

In the event the motor stops because the ignition circuit and consequently switch 49 have been opened by turning key 64 to "off" position, diaphragm 71 and shaft 61 will again upon release of the accelerator move arm 28 to contact barrier 39, swinging indicator 24 to the center of N, the neutral position on quadrant 17. As soon as the ignition switch is again turned "on" by key 64, which closes switch 49, the motor will restart, followed again by the movement above outlined to free selector lever 2 for reposition at an in-gear position.

If the motor will not start because of a weak battery and the operator wants to have the vehicle pushed with the motor in-gear to turn the motor over, arm 58 can be moved manually to the position shown in FIG. 1, so that screw 81 can be turned to seat in detent 91, holding shaft 61 and shuttle fan 57, so that manual gear selections can be made and held.

After the selector lever 2 has been automatically moved so that indicator 24 centers over N on the quadrant 17, when the ignition switch has been turned "off," the driver may lift lever 2 to make tooth 29 clear barrier 39 so that indicator 24 can be centered over P on quadrant 17, the parking position of the transmission, and tooth 29 can again drop into contact with the continuation of arcuate shoulder 40. Such manual movement will cause crank arm 28 to move away from contact with arm 58 which has already moved to the limits of its counterclockwise travel. However, contact of conductor plate 34 with heads 44 and 45 continues so that in parking position, when the ignition switch is again turned to "on," causing switch 49 to close, the motor will start and diaphragm 71 along with shaft 61 will move toward shell 68 to withdraw plate 34 from contact with heads 44 and 45 to break the starter circuit, permitting manual in-gear selections.

It will be recognized from the preceding description of FIG. 1 that in this form of the invention there is both automatic control of the starting of the motor and automatic control of the position of the transmission adjustment member during the period of starting the motor. A device responsive to and actuated by vacuum or lack of vacuum closes a switch in the starter circuit and also moves the selector lever for adjusting the transmission. It is possible to lock the device in an inoperative position by the hand-operated screw 81 or the accelerator operated plunger 89, and it is further possible to control 81 through a dash-mounted plunger for easier control ability. It should also be pointed out that while the diaphragm assembly of FIG. 1 requires release of the accelerator before restarting of the motor after stalling, the diaphragm assembly of FIG. 2 does not require such release, but restarts the motor immediately upon stalling.

In FIG. 3 is shown one form of an accessory installation of the neutral positioning automatic starter. In this view, it is assumed that the telescoped shafts 1 and 7 of FIG. 1 pass within the steering column 12 so that, although they can be reached in some vehicles on the engine side of the fire wall, a more universal attaching means is herein shown for easy location of the unit under the dash. The quadrant 124 indicates the shifting positions for another type of automatic transmission wherein no parking position is used, and the reverse gear position is reached by lifting the lever 2 to shoulder a terrace abutment before locating indicator 121 at R, manual return to neutral position being accomplished by lateral counterclockwise pressure as in the other in-gear positions, no lifting being necessary.

With this arrangement crank arm shaft 122 is carried in bearing housing 123, which is welded to strap 125 which is clamped to the steering column 12 with bolt 126. A universal ball seat 127 is formed in the end of projecting arm 128 of the crank arm shaft 122, in which ball end 129 of fork connector 130 rides. The upper frog end of 130 is pivotally joined to selector lever 2 at a point 130 nearer to the outside end of lever 2 than pivotal point 10. Shaft 122 telescopically receives shaft 131, as shown by dotted lines, set screw 132 holding the two shafts together rigidly. The lower end of 131 terminates in a crank arm 133 on the end of which are mounted bearing ears 134. Countersunk area 135 of crank arm 133 carries non-conducting inset 136 through cooperating screws 137, there being based in the countersunk area 138 of 136 electrical conductor plate 139 through attaching screw 140. Bearing block 141, held to strap 142 by screws collectively numbered 143, strap 142 being clamped to steering column 12 by bolts 145, encases shaft 131 at its lower end through bearing projection 146. It carries spring steel arm 147 attached through screw 148 to bear resistibly against crank arm 133 when 133 is swung counterclockwise, and carries electrically nonconducting block 149 through attaching screws collectively numbered 150. Embedded in 149 are electrical contact screws 151 and 152 projecting through 149 in arcuate alignment with conductor plate 140.

A brace 153 firmly joined to the hidden side of bearing block 141 terminates at its projected end in ball socket 154 to accept ball 172, given the same number as in FIG. 1, and formed from the diaphragm shell in the same manner, all parts relating to the diaphragm herein used being identical with and numbered the same as in FIG. 1, with the exception of the shaft 155 substituting for shaft 61 in FIG. 1.

Shaft 155, with a reduced and threaded diameter to carry nut 93, dished plates 94 and 95 and diaphragm 71, also carries cross-drilled vent hole 156, and is drilled from the opposite end as far as vent hole 156 to accept telescoped shaft 157, detents 90 and 91 being cut into the outer surface, as in FIG. 1. Shaft 157 connects pivotally at 158 through bearing ears 134 with crank arm 133. Barrel 83 now passes over flexible shaft 159, housing 160 being mounted against the engine block by way of bracket 161 and bolt 162. In FIG. 6, there is shown a conventional bellcrank 163 of the carburetor linkage system, mounted on the engine block by way of pivotal bearing support 164 by bolts collectively numbered 165. Spring 166, connecting 164 and 163, urges 163 to a carburetor closed position, and linkage shaft 167 connects therewith leading to the carburetor. A collar 168 grips linkage shaft 167 through closure bolt 169 and supports a depending raceway 170 through which flexible shaft 159 passes freely, ball 171 capping the end of 159.

Terminal 151 on block 149, through lead 172, connects to ground battery 173, while terminal 152, through lead 174 connects to terminal screw 175, FIG. 4, which projects inwardly through the lower standing edge of recessed electrically non-conducting composition box cover 176. A similar screw terminal 177 mounted in the same manner in box 176 and standing parallel to 175, connects through lead 178 to the grounded starter 179. Box 176 shown in perpendicular cross section at the midpoint in FIG. 5, supports through hole 180, freely rotating electrically non-conducting collar 181 from which depends on the undersurface, lip 182, and with which threaded ring 183 cooperates on the outer face of box 176, collar 181 having through its closed center a slot 184 (FIG. 4). The lower end of lip 182 has electrically conducting cover 185 crimped or pressed over it in alignment with and for simultaneous contact with the ends of both terminals 175 and 177. Ignition key 186, as shown in FIG. 5, passes through slot 184 and into ignition switch 187, over which box 176 is mounted against dash 188 by means of screws 189.

In the operation of the mechanism of FIG. 3 thus far described, the ignition key 186, as shown in FIG. 4, turned to an "on" position, and with terminals 175 and 177, consequently, through the turning of collar 181 completing the starter circuit between leads 174 and 178, it is evident from knowledge gained from the operation of the similar mechanism in FIG. 1 that the motor is in operation, since the starter circuit is shown to be broken at terminals 151 and 152 due to the fact that manifold vacuum in 76 has caused diaphragm 71 and shaft 155 to move toward shell 68 to the position shown. Crank arm 133 is free of any counterclockwise pressure so that spring steel clip 147 has obviously been able to press arm 133 in a clockwise direction sufficiently far within the neutral position to break the circuit between terminals 151 and 152. Release of counterclockwise pressure upon arm 133 has also permitted manual positioning of selector lever 2, as indicator 121 shows, at R, the reverse in-gear position, shaft 157 at all times sliding freely with arm 133, up to the point of abutment at vent hole 156 within shaft 155, at which position it is shown to be. It will therefore be noted that from the functional standpoint, shaft 157 corresponds to shuttle 57 of FIG. 1.

In the event of motor failure while the ignition switch remains "on," vacuum in manifold 76 disappears. With the release of the accelerator, the seating of ball 171 against the shoulder of collar 168 causes attached flexible shaft 159, FIG. 6, to lift barrel 83 upwardly from engagement with detent 90, so that diaphragm 71 and shaft 155 are driven by expanding spring 96 away from shell 68, telescoping shaft 157 abutting 155 at vent 156, the combination pressuring upon crank arm 133 to swing 133 and all related parts in a counterclockwise direction to the neutral position where clip 147 yields to the greater force of spring 96 permitting conductor plate 139 to contact heads 151 and 152, so that the starter circuit is completed and the motor is restarted. With a vacuum condition re-established in the manifold 76, diaphragm 71 along with shaft 155 returns to the position shown in FIG. 3, spring clip 147 forcing arm 133 away from heads 151 and 152 to break the starter circuit.

It is obvious that with turning ignition key 186 to "off," collar 181 will rotate counterclockwise, because of the bearing of key 186 upon the sides of slot 184 to separate conductor cover 185 from contact with terminals 175 and 177, so that with the fading of vacuum in manifold 76 and the moving of lever 133 in a counterclockwise direction for contact of conductor plate 139 with terminals 151 and 152 the motor will not start. However, upon again turning key 186 clockwise to the position shown in FIG. 4, the ignition circuit and starter circuit will be completed and the motor will automatically restart, returning the diaphragm 71 and related parts to the position shown in FIG. 3, and freeing lever 2 for manual selection of any of the positions indicated on quadrant 124.

It is obvious that the mechanism of FIG. 3 operates in substantially the same manner as that of FIG. 1, and that if barriers are incorporated in the range cage, as in FIG. 1, cam tooth 62, and shoulder 63 of FIG. 1 can be incorporated in the design of FIG. 3 to lift arm 133 over such barriers. While there is shown mask 176 in FIGS. 4 and 5 for simplified universal accessory installation, where ignition switch terminals are easily accessible under the dash of the vehicle, mask 176 and related parts may be eliminated. Lead 172 would then connect at one end to the ignition terminal on the "dead" side of the ignition switch which leads to the coil and distributor and at the other end to terminal 151. Terminal 152, through lead 174, would connect directly to grounded starter 179, thereby eliminating lead 178.

Another form of this invention is shown in FIGS. 7, 8, and 9, to provide a means for returning the selector lever 200 of an automatic transmission to the neutral position when in-gear positions are located on both sides of neutral. In a more simplified construction than in FIG. 1, selector lever 200 of U-shaped cross-sectional construction now bears at its inner end with cam shoulders 201 and 202 on the upper shoulder of bearing housing 203 welded to stering column 12, shown to be broken at 205. Shaft 206 projects at its upper end through bearing housing 203, there being firmly attached to its upper extremity crank arm 207 at the outer end of which is carried upwardly projecting bearing housing 208 for engagement with lever 200 at pivotal point 209. The lower end of shaft 206 has finger 210 projecting from its side to engage with detents 211, 212, 213, 214, and 215, on or adjacent to terrace 216, terrace 217, or barrier 218 incorporated in bearing housing 219 welded to steering column 12, and through which shaft 206 passes. A spring 204 encircles the lower end of shaft 206, based at its upper end against housing 219 and at its lower end against cam 220 which is rigidly joined to the lower end of shaft 206.

Arm projection 221 of cam 220 terminates in a ball socket to receive the ball end of shifter linkage 222 leading to the transmission, there being a toothlike protrusion 223 superimposed upon and projecting outwardly from the cam-shaped surface of 220. Formed along the periphery of cam 220 there depends a collar 224, and into this standing edge surface there is cut from the underside cam seat 225, parallel to the steering column 12 upon one shoulder and inclined thereto upon the other shoulder, as well as cam seat 226 inclined thereto upon both shoulders.

Shaft 61, of the type used in FIG. 1, is flexibly joined through bearing ears 231 to shuttle fan 227 which rotates through its bearing hub 228 in bearing housing 229, cut away at 230—230 for illustrative purposes, firmly attached to steering column 12, there being an upwardly projecting cam shoulder 232 formed along the periphery of 227 and upstanding arm 233 in the arcuate path of tooth 23. Shuttle fan 227 is perpendicularly bored through the axial center of bearing hub 228 to receive shaft 234 to the upper end of which is permanently affixed cam 235, there being formed with 235 a standing tooth 236 adjacent the periphery of cam seat 235 in the arcuate paths of cam seats 225 and 226, and a downwardly depending cam shoulder 261 along the periphery of cam 235 in alignment with cam shoulder 232 of fan shuttle 227. Along the lower axial surface of shaft 234 there is cut a spline groove 237, shown in broken lines and on the underside of 234, to be engaged by key 238, mounted to project inwardly through centrally bored separator collar 239 swedged into bearing bore 240 of bearing housing 229. The lower end of shaft 234, furthermore, is threaded to engage threaded cap 241 riding in bore 240, spring 242 passing over the lower end of shaft 234 and bearing against separator collar 239 and cap 241.

The diaphragm herein employed and shown in FIG. 9 is identical to that used in FIG. 1 but is differently numbered 262, there now being added to shell 69 through threaded circular openings 243 and 244 electrical non-conducting threaded inserts 245 and 246 through the threaded centers of which are inserted electrical conducting screws 247 and 248 projecting into the concave area of shell 69. Dished plate 95 now has attached through screws 249 dished ring 250 of electrically non-conducting material into the cupped area of which is pressed and gripped electrical conductor ring 251 in alignment with screws 247 and 248. Screw 248 connects through lead 252 to grounded battery 253, while screw 247 connects through lead 254 to switch 255, operated coincidentally with the ignition switch symbolized by key 263, and shown to be "on", switch 255, furthermore, connecting through lead 256 with grounded starter 257.

In the operation of the mechanism of FIGS. 7–9 so far described, indicator 258, an arm projecting from and connected with lever 200 at 259 is positioned at R of quadrant 260 in FIG. 7, the reverse in-gear position of the transmission, finger 210 being seated in detent 214 on terraced shoulder 217, and since shaft 61 is shown to be in a withdrawn position, it can be assumed that the motor of the vehicle is operating. With the failure of vacuum due to stalling of the motor, or stopping of the motor by turning off the ignition key 263, shown in FIG. 9, shaft 61 pressures upon shuttle fan 227 to move 227 in a counter-clockwise direction, so that cam shoulder 232 of fan shuttle 227 engages cam shoulder 261 of cam 235, in the manner shown in FIG. 8, shifting cam 235 upwardly, shaft 234 following along groove 237 engaged with key 238, tooth 236 meanwhile pressuring upwardly against the left inclined wall of cam seat 226. Such upward movement tends to lift finger 210 from engagement with detent 214 on terrace 217 and pressure of tooth 236 on the left inclined shoulder of cam seat 226 tends to rotate cam 224 clockwise thereby moving lever 200 so that indicator 258 moves to N, the neutral position of the transmission. The linkage 222 attached to arm 221 of cam 220 is thereby moved so that the transmission of the vehicle is shifted to the neutral out-of-gear position.

In FIG. 8 shaft 61 is shown to be fully extended from shell 69, having reached the limit of its counterclockwise movement. Arm 233 of cam 227, therefore, meets and abuts tooth 223, while finger 210 drops into detent 213. Diaphragm 71, with accompanying parts, has moved away from shell 68 toward shell 69, bringing electrical conductor ring 251 into contact with screws 247 and 248, to complete the starter circuit for staring the motor and then to break the circuit in the same manner and to reposition diaphragm 71 in the same way as already described when vacuum is built up in manifold 76.

It is evident that should the selector lever 200 have been positioned at P, the parking position of the transmission, with finger 210 resting in detent 215 behind barrier 218, the motor, in case of failure, would be restarted in the same manner as in the neutral position, but without any lateral movement of lever 200, tooth 236 rising directly into cam seat 225. Under such condition, lever 200 can be lifted, if desired, to clear tooth 236 as well as barrier 218 to move to the neutral position, lever 200 pivoting on cam ears 201 and 202, arm 207 lifting at pivot point 209, and shaft 206 following upwardly to compress spring 204 and lift finger 210 from behind barrier 218. The motor meanwhile automatically starts if the ignition switch happens to be "on" or starts if the ignition switch is turned from "off" to "on" through the turning of key 263, shuttle fan 227 rotating clockwise for subsequent manual positioning of selector lever 200 at an in-gear position.

FIG. 9 shows through indicator 258 and quadrant 260 that selector lever 200 has been position at D, the driving range position of the transmission. When vacuum fails in manifold 76, shaft 61 rotates shuttle fan 227 counterclockwise, arm 233 contacting projecting tooth 223, cam shoulder 232 meanwhile contacting cam shoulder 261 of cam 235. Since this lateral movement brings tooth 236 directly under the center of cam seat 226, tooth 236 moves upwardly to seat at the juncture of the inclined shoulders of cam seat 226, the lateral movement causing finger 210 to slide out of detent 212 and drop into detent 213, the neutral position shown in FIG. 8. With the combination of parts again in the neutral position, the motor again restarts if the ignition is "on," or starts when the ignition switch is later turned "on," withdrawing arm 233 from abutment with tooth 223 for subsequent manual in-gear positioning. Should the selector lever 200 have been positioned at L, the low gear position of the motor, counterclockwise pressure from arm 233 bearing upon tooth 223, with the failure of vacuum, would have returned 200 to the neutral position of the transmission, as in the action of FIG. 9, with the same ensuing motor restart and freeing of selector lever 200 for repositioning in gear.

Although terraces 216 and 217 and barrier 218 are located at L, R, and P on the indicator quadrant 260, design innovations may require them at other or additional locations. For example, there may be a terrace at N so that selector lever 200 must be partially lifted to enter the neutral zone as from D and L, or from R. In such a case, tooth 236 can be located to lift cam seats positioned differently than those herein shown in order to lift and slide the selector lever to neutral, it being obvious that the cam technique here described is not intended for limitation to the exact terrace and barrier arrangements shown.

It is possible, in fact, where no barriers or terraces are employed for a return to neutral position, wherein the Reverse position is isolated from the Drive and Low positions on the selector quadrant, that a forked shaft 264, shown in FIG. 10 in a withdrawn motor operating position may substitute for shaft 61 so that upon projecting from diaphragm assembly 67, with the stopping of the motor, stub arm 265 of shifter arm 266 will be forced by the pitched prongs of 264 to center at the apex of the fork of 264 to drive 266 to the neutral position from any in-gear position.

While the mechanism so far described can be used to operate the customary push-button starter switch of the dash, which in turn ordinarily actuates a solenoid to close a heavy duty switch on the starter unit itself, so that the heavy lead from the battery need not be brought up the steering column, such a lead being impractical in both efficiency of operation and ease of handling, FIG. 13 shows an arrangement specifically whereby the dash push-button, the leads to the dash, and the solenoid can be eliminated.

Diaphragm assembly 262, cut away along line 276—276, contains the electrical contact ring 277, replacing and larger than ring 251 to carry the heavier current requirements of the starter circuit, pressed into electrically non-conducting disk 250, in turn mounted on dished plate 95, for contact, upon vacuum failure, with screws 278 and 279, also replacing screws 247 and 248 for greater electrical capacity, which are carried in shell 69 through electrical non-conducting inserts 280 and 281. A shaft 282, center bored with hole 283 and larger connecting bore 284, now carries nut 93, plates 94 and 95 and diaphragm 71 on smaller diameter, partially threaded shoulder 285. Ball support 73, drilled with hole 297 and ball end 72, now drilled with hole 286 through to the inner surface of shell 68, accept slidable, closely fitting flexible shaft 287, which also passes through bore 283 into larger bore 284 where it is capped by ball end 288 sliding freely within 284. Flexible shaft 287 passes at the other end through housing 289 cooperating with turned-in flange 290 of the vehicle's dash as well as through opening 291 of cup 292 mounted on the periphery of the ignition switch, generally designated as 293, and is capped by ball end 355 seated in cup 292. Arrow 294 shows direction of movement of 293 when the ignition key is turned "on", and indicates the position cup 292 assumes, in broken lines, under "on" conditions. Screw 279 is connected to heavy duty lead 295 direct from the battery while heavy duty lead 296 connects directly to the starter.

In the mechanism of FIG. 13 so far described, diaphragm 262 is assumed to be mounted at the base of the steering column on the engine side of the fire wall or upon the starter itself where the leads 295 and 296 from battery to starter can be kept at the minimum in length and consequently in power loss and is shown to be in a motor-off condition so that diaphragm 71 and related parts, induced by expanded spring 96, have moved away from shell 68 toward shell 69. Ignition switch 293 is shown to be "off" so that flexible shaft 287 is tensioned between attached ball ends 288 and 355 to hold shaft 282 and consequently electrical conductor ring 277 from contact with screws 278 and 279, shaft 282 already having driven selector lever 2 or 200 within the neutral range position.

When switch 293 is turned in the direction of arrow 294, cup 292 assumes the position shown by the broken lines, and flexible shaft 287 follows, so that flexible shaft 287 tends to move toward diaphragm housing assembly 262, thereby permitting spring 96 to expand further and ring 277 to contact screws 278 and 279 completing the starter circuit until manifold vacuum, due to renewed motor operation, again draws diaphragm 71 toward shell 68.

Where the automatic neutral starter is built-in and the shortest possible battery lead with the lowest power loss is desired, assembly 262 of FIG. 13, for example, can be made integral with the starter unit 690, as shown in FIG. 11, so that lead 296 from the diaphragm assembly 262 to the grounded starter is kept to the minimum possible length. With this arrangement, it becomes possible to employ the movement of diaphragm 71 through shaft 267, replacing shaft 282 of FIG. 13 and joining inner starter shaft 268 by way of ball connection 273, for not only urging the selector lever from an ingear position to neutral when the motor stalls through opening 274 of housing 68 by way of which 267 now projects, but also at the same time to move pinion gear 270 into engagement with flywheel ring gear 271, to close the starter circuit for operation. Shaft 268 carries firmly attached key 269 endwardly slidable within key slot 275 of the rotatable armature 272 of the motor, so that when shaft 268 moves toward the flywheel to engage ring gear 271 and the starter circuit is closed, pinion gear 270 will be rotated to turn said ring gear 271 and the flywheel. As soon as the motor has been restarted vacuum will pull shaft 268 through shaft 267 and ball connection 273 to break the engagement of 270 with 271 and will free the selector lever for in-gear positioning. Though not shown, flexible shaft 287 and component parts are assumed to be encased within shaft 267, remotely controlling the contact of conductor plate 277 and contact points 278 and 279 through operation of the ignition switch, as shown in FIG. 13. It is, of course, evident that a governor controlled, vacuum controlled, or otherwise automatically controlled switch, as shown in FIG. 2 or in subsequent views to be discussed, can be cut into the starter circuit to substitute for the on-off control of flexible shaft 287 of FIG. 13.

Where the automatic neutral starter is built-in, it may be advantageous to mount the diaphragm unit under the floor board of the vehicle at the side of the transmission as shown in FIGS. 12, 14, 15, 16, and 17. It may also be desirable to operate the unit with other powerizing means than vacuum. FIG. 12, therefore, shows a fluid pressure cylinder composed of cylindrical barrel 299 threaded on the outer surface at its ends to join with threaded cap 300 carrying ball support 301, and threaded fluid pressure coupling port 302, and to join at the opposite end with threaded end cap 303, drilled through at its center with shaft opening 304 and off center with air port opening 305. End cap 303 is further threaded on its outer shoulder to receive threaded electrical nonconductor cap 306, having center opening 307 and carrying screws 308 and 309 diametrically perpendicular to its axial center, ends of said screws projecting into opening 307, and said screws, furthermore, connecting at their heads with leads 310 and 311 of the starter circuit.

Cylinder barrel 299 encases freely sliding piston ring 312 gripped between collar 313 threaded upon larger collar 314, and 314 which, in turn, is threaded upon shaft 315 and is recessed at 316 to nest and seat spring 317 bearing at its opposite end against the inner surface of cap 303. Shaft 315, passing through end cap 303 at center opening 304, is shouldered at threaded portion 318 to a greater diameter, said threaded portion receiving threaded, electrically non-conducting collar 319, encircled by threaded, electrically conducting ring 320, aligned with inwardly projecting and exposed ends of screws 308 and 309. The enlarged portion of shaft 315 slides through opening 321 of transmission shifter arm 322 depending from the side of transmission 298 at pivotal point 323, and is capped by mushroom head 324. Ball socket support 325 is firmly attached to transmission 298 and flexibly joins ball end 301 of end cap 300.

In the operation of the mechanism of FIG. 12, so far described, the shifter arm 322 is shown by the indicating letters R, L, D, and N to be positioned at D, the driving range of the transmission 298. In this construction, port 302 connects with an air pressure source such as a pump operating directly from an auxiliary shaft of the motor of the vehicle delivering pressure only when the said motor is in operation, or from the water pump of the cooling system, or from an oil pressure source such as the oil pump of the motor, or an oil pressure pump incorporated within the automatic transmission, likewise delivering pressure only when the motor is operating, or the like fluid pressure source, such operating condition now shown to be existing, pressure having compressed spring 317 and having driven piston shaft 315 toward end cap 303 so that mushroom head 324 permits free gear selection.

With the stopping of the motor, fluid pressure through port 302 disappears and spring 316 expands, driving shaft 315 toward end cap 300, causing mushroom head 324 to bear against arm 322 at the edge of opening 321 to move arm 322 to the neutral position N, at the same time seating ring 320 against screws 308 and 309 to complete the circuit from the battery via lead 310 to the lead 311 connecting with an ignition operated switch of the type already described and thence to the starter motor, connection to the accelerator in this arrangement being unnecessary since the source of pressure is constant above a minimum while the motor is operating.

The fluid pressure motor herein described and shown in FIG. 12 for moving the selector lever to the neutral position and then closing the electrical circuit of the starter for restarting the motor can be mounted, it should be noted, as can the other designs herein disclosed, upon the steering column or at other convenient locations on the vehicle, and that lifting means to clear terraces and barriers, where required, can also be incorporated, the design shown being the most simplified and obvious form of this particular type of motivating unit.

While the preceding figures have shown vacuum and positive pressure operated power supplying means, in FIG. 14 is shown an electrical solenoid source of power adjoining the transmission 298, to return the transmission to a neutral condition when a manually contacted starter cranks the motor. Solenoid 325, supported through ball end 326 in socket arm 327 firmly attached to the transmission 298, accepts through its hollow center indicated by 328, soft iron core 329. A shaft 330, preferably of electrical non-conducting material, capped by mushroom head 331 and passed through opening 332 of depending shifter arm 322, threads into the exposed end of core 329. An ignition switch generally designated as 333, has attached at its periphery curved, electrically non-conducting segment 334, over which is crimped electrically conducting curved shoe 335 for contact with the ends of screw terminals 336, connected by lead 337 to grounded battery 338, 339, connected to ignition circuit 340, and to 341, connected to lead 342 joining lead 343 connected to solenoid 325 at screw 344 and joining to lead 345 connected to ground starter 346, said screws 336, 339 and 341 being threaded into non-conducting collar 347 which is secured to the dash of the vehicle by means of screw 348. At another point on the periphery of ignition switch 333, there is mounted finger 349 shown in abutment with expanded but compressible spring 350 clipped into bracket 351 which is mounted on the dash of the vehicle by screw 352. Solenoid 325 is grounded through screw 353 and lead 354.

In the operation of the mechanism of FIG. 14 so far described, ignition switch 333 is shown to be in a motor "on" position completing the circuit from the battery 338 via lead 337, screw 336, conductor collar 335, and screw 339 to ignition circuit 340, so that with the crankshaft of the motor in rotational operation, the customary spark plugs in the ignition system are fired by the customary distributor at timed intervals. In case the motor stalls, the operator manually turns the ignition key in a clockwise direction to compress spring 350, thus connecting the battery through conductor collar 335 with screw 341 to energize coil 325 and operate starter 346, core 329 being drawn into opening 328 of coil 325 by the magnetic lines of force moving in an orbit through the opening 328 of the coil 325 toward ball end 326. Shaft 330, in following core 329, causes mushroom head 331 to seat against opening 332 of arm 322 to force arm 322 from the low gear position shown to the neutral position of the transmission. Release of the ignition switch 333 by the operator allows spring 350 to expand and to return 333 to the position shown in FIG. 14 so that coil 325 is de-energized freeing arm 322 for manual in-gear positioning, starter 346 disengaging from the re-started motor. Obviously, the simplified form of shifting is shown here, but if lifting is required, the structure of FIGS. 1, 3, and 7–9, or its equivalent, may be used.

FIG. 16 shows an automatic neutral starter arrangement of a solenoid 360 carried by ball end 361 in socket support 362 firmly attached to automatic transmission 298. Non-conducting solenoid end 363 supports in formed shoulders 364 and 365 inwardly projecting screws 366 and 367, the ends emerging in the path of conductor ring 368 threaded upon non-conducting ring 369, in turn threaded upon soft iron core 370 which passes through opening 371 within coil 360. Shaft 372, preferably of electrical non-conducting material and having firmly attached mushroom head 373 at its free end, engages shifter arm 322 through opening 374, shifter arm 322 pivoting at 323 at the side of transmission 298, and threads into core 370. Screw 367 connects by lead 375 to grounded battery 376, coil terminal screw 377 connecting by lead 378 to 375 for similar connection to the battery. Screw 366 connects by lead 379 to starter 382 which is grounded by lead 383. Solenoid terminal screw 384 connects through lead 385 to motor-operated governor-controlled switch 386, or to motor vacuum controlled switch 387, to be later explained in detail, lead 388 connecting either 386 or 387 to switch 389, a lead 390 from switch 389 joining lead 383 for grounding. Mushroom head 373 carries eye 394 for flexible connection to relaxed spring 395 which, at its opposite end, joins bracket 396 mounted securely on transmission 298 by screw 397, normally positioning shaft 372 in the position shown. Key 398 symbolically indicates that the ignition switch of the vehicle controls switch 389.

In the operation of the mechanism of FIG. 16 so far described, the ignition switch represented by key 398 is assumed to be closed and switch 389 is assumed to be closer with governor 386, driven by the vehicle motor, rotating so that there is no electrical connection between leads 385 and 388, or, in the case of the vacuum switch 387 is employed in the circuit instead of governor 386, diaphragm assembly 67, the type used in FIG. 1, breaks the circuit due to the presence of manifold vacuum. In the case of motor failure the circuit between 385 and 387 is completed so that current from battery 376 flows via lead 378 through coil 360 by way of lead 385, governor switch 386, or vacuum switch 387, lead 388, switch 389, and lead 390 to the ground, causing soft iron core 370 to move within coil 360 and to pull shifter arm 322 from reverse gear position to neutral position, expanding spring 395, whereupon conductor ring 368 bears upon the inwardly propecting ends of terminal screws 366 and 367 so that current flows from battery 376 through lead 375, lead 379, starter 382, and lead 383 to the ground, to recrank the motor. With the motor restarted, governor switch 386 or vacuum switch 387 again breaks the solenoid circuit, spring 395 again contracts, moving shaft 372 and core 370 to the position shown, immediately breaking the starter circuit and freeing shifter arm 322 for manual positioning.

It should be noted that solenoid coil 325 of FIG. 14 or 360 of FIG. 16 can be the same magnetic switch coil customarily employed with the starter to close the heavy duty switch circuit usually found on the remote controlled starter, as previously discussed. In that case, shaft 330 or shaft 372 would connect directly with the magnetic switch coil in the starter, and coil 325 or 360 would not be employed.

In one type of automatic transmission, it is possible to move the selector lever, after the motor has stopped, to "R," the reverse gear position, where the motor and rear wheels are locked in a "parking" condition. With this arrangement, the selector lever must be moved to "N," the neutral position, to complete the starter circuit before the motor can be started. Since the form of the neutral starter, shown in FIG. 16, leaves the lever at any prepositioned in-gear selection until the ignition key is turned to "on" and the solenoid is energized, this neutral starter design is well adapted for application to the reverse gear parking brake transmission, and will eject the lever to neutral only when the ignition key is turned to "on," at which time the driver is at the controls to hold the vehicle through foot brake or hand brake application.

It should be further observed that the preceding fluid power motivating forms, such as vacuum and liquid pressures, that return to neutral of the selector lever occurs immediately upon motor failure, whether the motor stalls or the ignition key is turned to "off," and that with turning the ignition key back to "on," the starter circuit is found to be already closed for instant restart. In the solenoid form, the selector lever is not returned to neutral when the ignition switch is turned to "off," but only when the switch is again turned to "on," whereupon the starter circuit is then closed for motor restart. In the solenoid form, if the motor stalls and the ignition key remains "on," the selector lever is, of course, immediately returned to neutral and the motor is restarted, as with the fluid pressure motivating units. It is entirely possible to have the solenoid operate in the same manner as the above-described fluid pressure motivating forms, by making a solenoid responsive immediately upon motor failure, with a circuit breaker to interrupt the solenoid circuit as soon as the return to neutral is completed. However, for the sake of simplicity, such a circuit breaker has not been shown.

In FIG. 15 is shown a non-automatic H-gate type of transmission herein coupled through fluid coupling 411 to the motor of the vehicle. Shifter arm 322 pivoted at 323 at the side of transmission 400 is shown to be in an in-gear position 401 also being in gear at 403 where it is shown in broken lines, and in neutral at 410, also shown in broken lines. Brackets 404 secured to transmission 400 by screws 405 support through rivets 70 two diaphragm assemblies 67 and 262 of the types hereinbefore described, with detents 90 shown upon the surfaces of shafts 61 in elevation, for use with flexible shafts connecting to the accelerator.

Diaphragm 67 is constructed as in FIG. 1 where it is also numbered 67, shaft 61 abutting lever 322, when in a motor-on withdrawn position, as shown, while diaphragm 262 is identical to 262, FIG. 9, wherein electrical terminal screws 247 and 248, joining leads 408 and 409, are aligned to contact electrical conductor ring 251, vacuum ports 75 of both diaphragm 67 and 262 being commonly connected to the manifold source of vacuum.

In the operation of the mechanism of FIG. 15 so far described, the motor is shown to be in operation, vacuum having withdrawn both diaphragms 71 within 67 and 262 toward shells 68 and compressed springs 96. With failure of vacuum and release of the accelerator, springs 96 are permitted to expand so that if arm 322 is positioned in gear as shown, at 401, or in gear as at 403, shafts 61 will drive the shifter lever to a perpendicular midpoint, the neutral position 410, restarting the motor through contact of ring 251 with terminal screws 247 and 248 via leads 408 and 409.

It is obvious that where the reverse gear position is isolated from the other in-gear positions and there are no intervening barriers, the arrangement of two opposed vacuum diaphragms or cylinders, as in FIG. 15, can be used to advantage with an automatic type of transmission substituting for the method shown in FIGS. 7, 8, and 9. It should also be pointed out that where a semi-automatic starter or otherwise fully-automatic starter is separately used with a vehicle motor, that diaphragms of the type shown at 67, FIG. 15, can be used to advantage to eject the shifter lever to a neutral position, no automatic starting switch being needed therewith.

FIG. 18 shows a manual method for returning the selector lever of a transmission to the neutral position for immediate automatic starting of the motor. Range cage 430, customarily mounted at the base of the steering column, preferably of electrical non-conducting material, contains surface detents 431, 432, and 433 for reverse, low and drive positions, respectively, sufficiently shallow so that lateral pressure upon the selector lever such as 2 of FIG. 1 or 200 of FIG. 3, will immediately eject arm 434 (substituting for arm 28, 133, finger 210, or the like), preferably of electrical non-conducting material in which is embedded protruding electrical conducting plug 435 for movement to the position shown. Terrace 436 underlies detent 431, which requires lifting of 434 when moving toward reverse gear position, there being a barrier 437 over which 434 must also be carried before moving into or out of park position.

Up-ended terminal screws 438 and 439 embedded in range cage 430 are interconected and mutually grounded by way of lead 440, while up-ended terminal screws 441 and 442 also embedded in range cage 430 are interconnected by lead 443 to join switch 444 which, in turn, is joined by lead 445 to terminal screw 446 embedded in and projecting through electrically non-conducting block 447. Block 447 further carries embedded and projected terminal screw 448 connecting through lead 449 to grounded starter 450, screw 451 holding 447 by strap 452 and screw 453 to diaphragm unit 67, whose shaft 455 has mounted on the exposed end conductor disk 456 gripped in non-conductor collar 457 threaded thereto, diaphragm assembly 67 being of a type similar to that shown in FIG. 1. Arm 434 is shown to be in neutral position, projecting plug 435 having dropped into recessed area 458 to close the circuit between terminals 438 and 441, there being another recessed area 459 between screws 439 and 442. Key 460, symbolizing the vehicle's ignition switch which controls the switch 444, is in an "on" position along with switch 444, and the operating motor has created vacuum to hold shaft 455 of diaphragm assembly 67 through attached diaphragm 71 in a position to keep electrical conductor disk 456 from closing the circuit across terminal screws 446 and 448.

In the operation of the mechanism of FIG. 18 so far described, when vacuum fails and the accelerator is released, spring 96 is permitted to expand and drive shaft 455 toward block 447 and seat disk 456 against the ends of terminals 446 and 448, thereby closing the circuit of the starter. As soon as the motor has been restarted and vacuum again withdraws diaphragm 71 and shaft 455 to the position shown, the starter disengages. In case arm 434 is lifted over barrier 437 to seat plug 435 in depressed area 459 the starter circuit is closed between terminal screws 439 and 442 to provide the same motor starting action as described for the arm 434 in the neutral position. If arm 434 is left in the neutral or park position when the ignition key 460 is turned "off," upon turning the ignition "on," the motor will immediately restart and the starter circuit will thereupon be broken, provided release of the accelerator acting through barrel 83 has permitted disk 456 to rest against terminals 446 and 448.

FIG. 19 shows a manual method for returning the selector lever of an automatic transmission to neutral or park position where continued side pressure upon the selector lever will cause the motor to start. A range cage 470, preferably of electrical non-conducting material, has recessed therein detents 471, 472, 473, and depressed sections 474 and 475, as well as barrier 476 and terrace 477 in which are embedded upwardly projected and protruding screw terminals 478, 479, 480, and 481. Terminal screws 478 and 480 are interconected by lead 482 to grounded starter 483, while terminal screws 479 and 481 are interconnected through lead 484 to grounded battery 485. L-shaped arm 486, preferably of electrical non-conducting material, has downwardly protruding nob 487 and has attached by screws 488 the spring arm 489 and has embedded in the underside of its lateral extension 490 electrical conductor plate 491.

In the operation of the mechanism of FIG. 19 so far described, when the selector lever, such as 2 of FIG. 1 or 200 of FIG. 7 to which arm 486 is firmly joined, is pushed laterally from an in-gear position counterclockwise to neutral position, continued pressure compresses spring 489 to permit electrical conductor plate 491 to slide over and contact the projecting ends of terminal screws 478 and 479 thereby closing the starter circuit so that, assuming the ignition switch is turned "on," the motor will start and the counterclockwise pressure can be removed from 486 to allow spring 489 to expand and break the starter circuit between terminal screws 478 and 479.

If arm 486 is lifted over barrier 476 by lifting the end of selector lever 2 or 200 and counterclockwise pressure upon 486 is continued so that upon release of 486 nob 487 will drop and engage with depressed area 475 in the parking position, continued lateral counterclockwise pressure toward terminal screws 480 and 481 will also start the motor in the same manner as already described for the neutral position of arm 434 with subsequent breaking of the starter circuit when pressure is released.

In FIG. 20 there is illustrated an application of the neutral positioning diaphragm to a semi-automatic type of starter operating through the accelerator, a conventional semi-automatic foot-starter construction being shown in dotted lines. The starter unit 500 carries a heavy duty or solenoid type of switch 501, suitable for closing the starter circuit as well as engaging the starter pinion with the flywheel ring gear, the circuit contact of which is closed by movement of plunger 502 joining to crank arm 503 through flexibly connecting link 504. Crank 503 is joined firmly to hub 505 and is normally held in a retracted position to bear upon starter unit 500, through extended tail 506 and by means of spring 507 connecting between arm 503 and starter 500. Arm 503 firmly fixed to the underside of accelerator pedal 521 carries at the opposite end eye 509 to receive shaft 510 capped by ball end 511. Arm 503 at its hub 505 is firmly joined to shaft 512, rotating in bearing support 513, affixed to the vehicle frame. The opposite end of shaft 512 terminates in eye 514 to which is pivotally attached arm 515, through frog 516, there being an aperture 517 above the frog for acceptance of shaft 518 loosely locked for lateral movement by double locking nuts 519 and 520 threaded thereon, shaft 518 connecting flexibly at its opposite end through ball joint 498 to shaft 499.

Accelerator pedal 521 is mounted upon the vehicle floor-board 522 in the usual manner through pivoting points 523 and 524, and engages the ball end 525 of the accelerator shaft 526 at socket 527 formed therein, there being an angled portion 528 in accelerator shaft 526 in alignment, when in a released position, with the end of pivoting arm 515. Neutral positioning diaphragm assembly 67, the form shown in FIG. 1, replaces the diaphragm assembly customarily used in the semi-automatic starter shown herein and is fixedly mounted to the vehicle frame by bracket 494. Shaft 499, forming ball 497 at one end to flexibly join shaft 518, enters shell 530 of assembly 67 through bearing opening 529. Shaft 499 corresponds to shaft 61 of FIG. 1, and carries diaphragm 71, as shown in cross-sectional view, FIG. 20A. Shell 530 has formed adjacent to opening 529 apertured bearing cylinder or hub 532 to receive shaft 531 carrying arm 533, permitting the entering end of shaft 531, pivotally joined at its upper end to shaft 510, to engage a locking detent 90 cut into the surface of shaft 499 when shaft 499 is positioned as illustrated in FIG. 20A, shaft 531 being normally urged toward cylinder 532 by spring 539 attached to arm 533 of shaft 531 and to shell 530. Enclosed diaphragm 71 is firmly sealed to the end of shaft 499 by the pressure of cone 496 threaded to shaft 499, cone 496 also entrapping ball end 495 attached to flexible shaft 534 emerging from housing 535. The other end of shaft 534 passes through the movable end of the vehicle's shift lever, capped by a ball end to limit its movement therewith, in a manner already described in preceding figures. A vacuum line 536 connected to the manifold of the vehicle's motor, connects to shell 537, while port 538 admits air to shell 530.

In the operation of the mechanism of FIGS. 20 and 20A so far described the motor of the vehicle is assumed to be in operation, and vacuum is assumed to be holding shaft 499 in the position shown against the expansion of spring 96 within assembly 67, normally urging the enclosed diaphragm 71 toward shell 530. With the motor in gear and under load, sudden depression of the accelerator would normally permit shaft 499 to move endwardly away from assembly 67, due to drop in vacuum within the vehicle's manifold. To prevent this, shaft 510, linked to shaft 531, is permitted with the counterclockwise rotation of arm 508 and pedal 521 to be drawn by spring 539 toward housing 532, so that shaft 531 engages the detent 90 upon shaft 499 within shell 530, thereby preventing emergence of shaft 499 when the manifold vacuum drops.

Release of accelerator 521 causes shaft 531 to withdraw from contact with shaft 499 and expands spring 539, so that, with stalling of the motor, shaft 499 is allowed to emerge from housing 530, to move shaft 518 endwardly and thereby shift arm 515 counterclockwise about its frog end 516 to engage the shoulder 528 of accelerator shaft 526 whereupon, with downward movement of the accelerator, shaft 512 will be rotated counterclockwise to project plunger 502 into switch 501 for the completion of the starter circuit and cranking of the motor.

At the same time shaft 499 emerges from housing 530, flexible shaft 534 is drawn into housing 537. Inasmuch as flexible shaft 534 engages at its projected end with the shift lever of the transmission, the shift lever is moved to neutral position for safe starting of the motor.

While a plunger such as 531 is employed to hold shafts 499, 61, 155, 282, and 467 of the preceding views, in withdrawn position while accelerating, it is obvious that other techniques may be substituted.

For example, in FIG. 21 is shown a diaphragm type neutral starter in which the diaphragm is held in a withdrawn position against fading vacuum, due to load on the motor under operating conditions, by means of a solenoid holding coil. Diaphragm assembly 540, mounted securely and rigidly against the automatic transmission 541 by means of brackets (not shown) carries shaft 542 which rides in an elongated cut 543 of shift lever 544 pivoting and projecting into transmission 541 at 545, shaft 542 shown to be in a reverse gear position and abutting collar 546 securely attached to shaft 542. Shaft 542 projects through opening 547 of shell 548 and through an enlarged recessed head 549 threadably engages shaft 550, preferably of soft iron. Shaft 550 carries raised shoulder 551 forming a collar for gripping along with 549 the apertured dished plates 552 and 553 and non-conducting disc 554 in the rim of which is gripped conductor ring 555 between which is compressed flexible diaphragm 556. Shaft 550 is drilled at the opposite projecting end to accept ball end 557 of flexible shaft 558 and to threadably receive apertured cap 559 through the center of which passes flexible shaft 558.

Shell 548 of diaphragm housing assembly 540 has threaded into its face through threaded openings apertured discs 561 and 562 composed of electrically non-conducting material such as Bakelite, terminal screws 563 and 564 being threaded through their centers to project inwardly from the outer face of shell 548 in alignment with conductor ring 555, shell 548 also carrying air port 565.

Shell 566 joins shell 548 through rivets, generally designated as 567, to form a tightly sealed, enclosed area, the outer periphery of diaphragm 556 being gripped therebetween. Shell 566 carries vacuum port 568 and has formed in its face recessed and projected end 569, apertured at the center to threadably receive flexible shaft housing 570, as well as to carry in its hollowed interior pressed-in solenoid coil 571. Electrically non-conducting discs 572 and 573 thread into openings on the face of projected end 569, and through their apertured centers receive terminal screws 574 and 575 for connection to the opposite ends of the winding of coil 571. Expansion spring 576, shown to be compressed, bears expandably against dished plate 552 and the inner face of shell 566.

Housing 577 is mounted on the dash 578 of the vehicle to carry through its drilled center 579 plunger 580, with which flexible shaft 558 is securely joined through opening 581 by set-screw 582, and into the drilled core 583 of which is projected mushroom topped shaft 584. Cut 586 is routed out to receive tooth 587 pivoted at 588 in cut 586 and pivotally connected to shaft 584 under the head of which is carried compression spring 589 against a recessed area 590 of plunger 580, the outwardly extending end of plunger 580 forming a cuplike handle 591. Housing 577 is drilled perpendicularly to center opening 579 to form notch 592 for the engagement of tooth 587. Housing 577 threadably engages flexible shaft housing 570 at the end of center opening 579 and attaches to the dash of the vehicle through screw 593.

An electrical lead 594 connects the grounded battery 595 with ignition key 596 controlled switch 597, and lead 598 connected at the opposite side of switch 597 joins with leads 599 and 600, lead 599 connecting with terminal screw 563, and lead 600 connecting with terminal screw 574. Lead 601 connects terminal screw 564 with grounded starter 602 while lead 603 connects terminal screw 575 with grounded circuit breaker 604, which is of the relay type that is capable of completing or breaking the circuit when voltage through 604 varies with the change in voltage load between starter 602 and battery 595 when cranking and not cranking the motor as well as with the ignition interruption when the motor stops, the interconnecting leads not being shown. This type of relay is available on the open market, one such being the Synchro-Start and Startex, manufactured, respectively, by the Synchro-Start Corporation and the Bendix Aviation Corporation. The circuit breaker 604 may also be of the known breaker point type where the speed of the motor is ascertained by electrically measuring the frequency of the breaker points and disconnecting the starter as soon as the motor fires, and where the control recloses the starting circuit to restart the motor when the motor speed drops below the lowest possible pulling speed. Or the unit 604 may be of the type already shown and described in FIG. 16, wherein a diaphragm responsive to presence of vacuum within the manifold of the motor, or a governor controlled switch responsive to rotation of the motor, open or close the circuit. Other forms of circuit breakers, such as vacuum relay switches may likewise be employed at this point in the circuit.

In the operation of the mechanism of FIG. 21 so far described the motor of the vehicle is assumed to be in operation, due to the vacuum actuated position of diaphragm 556. Under this condition the circuit breaker unit 604 is assumed to be closed and current to be flowing from battery 595 via lead 594, switch 597, lead 598, lead 600, terminal screw 574, solenoid 571, terminal screw 575, lead 603, circuit breaker 604 and to the ground, so that when the operator of the vehicle accelerates the motor rapidly under load, and the vacuum in the manifold falls, the solenoid 571 will hold diaphragm 556 and related parts in the position shown. When the motor stops, circuit breaker 604 will open the circuit and prevent flow of current via the route already described so that solenoid 571 will become deenergized, the vacuum in the manifold will fade and spring 576 will expand to shift diaphragm 556 with related parts toward shell 548. Conductor ring 555, in alignment with terminal screws 563 and 564 will contact said terminal screws and lever 544 will be driven through contact of collar 545 to a neutral position. At the same time, provided key 596 remains in a switch closing position, current will flow from battery 595 via lead 594, through switch 597, lead 598, lead 599, terminal screw 563, conductor ring 555, terminal screw 564, lead 601, and grounded starter 602, to restart the motor, whereupon the vacuum reaccumulating within shell 566 after the motor fires to again close circuit breaker 604, diaphragm 556 will shift to the position shown in FIG. 21 and the lines of force excited by the winding of solenoid 571 will also urge diaphragm 556 toward shell 566, so that when manifold vacuum temporarily fades 556 will maintain the position herein shown.

Ball end 557 attached to flexible shaft 558 will remain stationary within the recessed area of shaft 550, but can be made to seat against apertured cap 559, and to withdraw diaphragm 556 to the position shown or to hold diaphragm 556 in the position shown if plunger 580 is pulled outwardly through the use of handle 591 to engage tooth 587 with locking notch 592, to prevent starter engagement when the vehicle is being pushed or towed. Further withdrawal of handle 592 and thumb pressure upon shaft 584 releases tooth 587 so that spring 576 is permitted to expand and shift diaphragm 556 with related parts toward shell 548 for neutral positioning of lever 544 and starter circuit completion through conductor ring 555.

In FIG. 22 is shown a neutral positioning diaphragm starting unit of the type shown in FIG. 9 or 13 coupled with a vacuum reservoir to maintain a relatively steady vacuum intensity within the diaphragm unit, even when the motor is under a heavy pulling load and vacuum falls within the manifold. Diaphragm assembly 67 is mounted securely against the side of automatic transmission 625 by means of brackets, not shown. Shaft 626 projects from shell 68 and is cut to a smaller diameter at shoulder 627 to bear against elongated cut 628 of shift lever 629 through which it projects, shift lever 629 pivoting and entering transmission 625 at 630. Air port 631 enters shell 68, while vacuum port 632 enters shell 69 and connects with tubing 633, the opposite end of 633 connecting with valve block 634 with vacuum tubing 635 connecting into the side of 633 between the end connections.

Housing 636, recessed with routed-out area 637 and apertured at 638, receives shaft 639 to the outside end of which is attached pulley 640, and to the inner end of which are pivotally attached links 641 and 642. Housing 636 cooperates threadably with the inner edge of flanged collar 643 of valve block 634 through the center of which is drilled valve bearing 644, upper valve end 645, drilled through its axial center receives shaft 646, terminating at one end in ball 647 and at the other end in pivot eye 648 for connection to links 649 and 650 which pivotally engage at their outer ends links 641 and 642 governor balls 651 as well as the opposite ends of spring 652.

Lower valve end 653 carries keyway slot 654 on its outer surface for slidable engagement with the inner end of setscrew 655 threaded into valve block 634 to prevent rotation of 653, and is cut to smaller diameter 656 the upper end of which threads into head 645 to encase ball 647 rotatable within its confined limits. Check valve 657, within routed cylindrical area 658 of block 634, seats against the end of smaller diameter cylindrical area 659 crossing valve bearing 644 to communicate with tubing 633, and is yieldably held against said end by spring 660 in turn confined by tubing 661 threaded into area 658 and at its opposite end into manifold 662. Manifold 662 may also connect through vacuum booster pump 663 shown in dotted lines through channeled area 664, also in dotted lines, to join area 659 for intensified and instantaneous vacuum, if needed. An air port 665 connects from the outer wall of valve block 634 to valve bearing area 644.

Housing 626, joined to shell 68 and ported at diametrically opposite points 666 and 667 to threadably receive tubing 635 and 668, carries shaft 626 with cut 669 to register with ports at 666 and 667 for communication via tubing 668 with reservoir 680. Grounded battery 670 connects through lead 671 with terminal screw 672 and terminal screw 673 connects with lead 674 to switch 675 controlled by ignition key 676, an electrical conductor ring of the type previously described herein within assembly 67 completing electrical connection between 672 and 673 when vacuum fades and shaft 626 is shifted toward shell 68 by an expanding spring within 67. Switch 675 further connects through lead 677 to grounded starter 678. Tubing 679 threaded into reservoir 669 threadably joins valve block 634 for communication with air port 665.

In the operation of the mechanism of FIG. 22 so far described, the motor of the vehicle is assumed to be operating, vacuum within manifold 662 having unseated check ball 657 against spring 660, and engagement of pulley 640 with the moving fan belt of the rotating motor having positioned governor balls 651 and expanded spring 652, as shown, to locate reduced diameter 656 of valve section 654 so that manifold 662 communicates with tubing 633 and consequently the inner area of shell 69. In the withdrawn position shown, shaft 626, through cut 669, permits manifold connection with tubing 668 from tubing 633 via tubing 635 so that reservoir 680 becomes exhausted of normal atmospheric pressure, and due to its large low-pressure area provides a sustaining, resilient holding force for diaphragm assembly 67, along with check ball 657, whenever manifold vacuum falls in quick acceleration under load.

As soon as the motor stops, governor balls 650 and 651, assisted by contraction of spring 652, toward each other to allow valve sections 645, 656, and 653 to shift downwardly closing communication of manifold 662 with tubing 633 and opening air port 665 for communication through tubing 633, 679, with the interior of shell 69 and reservoir 680, so that rapid deletion of vacuum intensity in the confined areas moves cut 669 of shaft 626 toward shell 68, thereby cutting communication of reservoir 680 with shell 69 and allowing shoulder 627 of shaft 626 to drive lever 629 to a neutral position and to close the starter circuit via the above-mentioned electrical conductor ring confined within 67, for current flow from battery 670, through lead 671, terminal screws 672, the electrical conductor ring, terminal screws 673, lead 674, switch 675, lead 677, to grounded starter 678 for restarting of the motor. In restarting the motor the tension of spring 652 is adjusted to permit outward movement of balls 650 and 651 and upward shifting of valve sections 645, 656, and 653 at the minimum firing speed of the motor, so that vacuum from manifold 662 flows directly to shell 69 for breaking of the starter circuit as soon as the motor becomes self-operating.

While vacuum booster pump 663 is herein used, if needed, to provide quick, intensified vacuum to shell 69 upon starting of the motor, it should be pointed out that, if of sufficient capacity, booster pump 663 may connect directly to shell 69, thereby eliminating the use of valve block 634 and related parts, as well as cut 669 in shaft 626 along with reservoir 680.

In FIG. 23 there is illustrated a governor actuated, neutral positioning, automatic starter unit, generally designated as 700, driven through contact of pulley wheel 701 with the fan belt of the car, although the unit may be shaft driven from the motor instead. Pulley shaft 702, integral with pulley 701 projects into housing 703 by way of bearing opening 704, and terminates in eye 705 for linkable connection to links 706 and 707. Balls 708 and 709 flexibly connect at pivoting points 710 and 711 to links 706 and 707 as well as links 712 and 713. Spring 714 attaches between pivoting points 710 and 711. A shaft 715, forming on collar end 717 and eye 716, flexibly connects with the ends of links 712 and 713 and also carries electrically non-conducting disc 718 threaded to its surface, disc 718 having threaded to its outer surface electrical conducting ring 719. Insert 720, threadably joined to the open end of housing 703 has formed at its center bearing hub 721 through which shaft 715 passes. Non-conducting discs 722 and 723, threaded into openings 724 and 725 carry electrical conducting terminal screws 726 and 727 which are aligned with ring 719. A frame 728 for attachment to the motor at holes 729 and 730 is welded to housing 703 at points 731 and 732, there being a bearing opening at 733 for pivotal mounting of bellcrank 734 which pivotally connects at one end to shaft 715 and at the opposite end to flexible shaft 735. Flexible shaft housing 736 threadably cooperates with frame 728 at one end and with bracket 737 at the opposite end, 737 being attached to the vehicle's transmission 738 through bolt 739 and flexible shaft 735 emerging from housing 736 passes through opening 740 of shifter lever 741 and is capped by ball end 742. Grounded battery 743 joins through lead 744, ignition switch 745 and lead 746 to terminal screw 727, while terminal screw 726, through lead 747, joins with grounded starter 748 to partially complete the starter circuit.

In the operation of the mechanism of FIG. 23 so far described, governor unit 700 is shown to be in a motor operating condition, wherein balls 708 and 709 are thrown by centrifugal force outwardly to the position shown, and links 706, 707, 712, and 713 have drawn shaft 715 toward the pulley wheel 701, and spring 714 has been expanded. Such positioning has further caused bellcrank 734 to rotate counterclockwise driving flexible shaft toward transmission 738 so that shift lever 741 is free to move from neutral to any of the in-gear positions, indicated by N, D, L, and R.

With the stopping of the motor, centrifugal force no longer operates to throw balls 708 and 709 outwardly, so that spring 714 tends to force shafts 702 and 715 through connecting links 706, 707, 712, and 713 away from each other, causing bellcrank 734 to rotate clockwise and pull flexible shaft 735 away from transmission 738. Ball end 742 then, in moving through its path of motion, bears against shift lever 741 at opening 740 to shift 741 to the neutral position, if 741 is not already located at neutral. In rotating bellcrank 734 clockwise, shaft 715 also brings electrical conductor ring 719 to bear against terminal screws so that current flows from grounded battery 743 through lead 744, closed ignition switch 745, lead 746, terminal screw 727, conductor ring 719, terminal screw 726, lead 747, and grounded starter 748 to restart the motor and return the governor to the position shown in FIG. 23.

In FIG. 24 is shown an automatic method for returning the shift lever to neutral position when the operator of a vehicle manually closes the starter circuit through a hand-operated lever on the vehicle's dash 780. Frame 760 is mounted against the backside of the dash 780 by means of bolts 761 and 762 cooperating with nuts 763 and 764. Flexible shaft housing 765 is threaded into frame 760 at point 766, while electrical conducting terminal screws 767 and 768 are threaded into non-conducting inserts 769 and 770 threaded into frame 760 at openings 771 and 772. Flexible shaft 773, carried within housing 765 is held at one end by set-screw 774, embedded in collar end 775 of shaft 776 within opening 777 of shaft 776. Collar end 775 also has threaded thereon non-conducting disc 778 to the outer surface of which there is, in turn, threaded conductor ring 779. A spring 781, bearing against disc 778 and the inner surface of dash 780 passes over shaft 776 threadably connecting to handle 782 through opening 783 of dash 780. Flexible shaft housing 765 threadably engages bracket 784 mounted against transmission 785 by means of bolt 786, so that flexible shaft 773 projects through opening 787 of shift lever 788, terminating in ball cap 789. Grounded battery 790 joins through lead 791, ignition switch 792, and lead 793 to terminal screw 768 while terminal screw 767 through lead 794 joins grounded starter 795.

In the operation of the mechanism of FIG. 24 so far described starter handle 782 is shown to be in released position and the vehicle to be in reverse gear. Assuming that the motor is in operation, motor failure would require the operator of the vehicle to pull on handle 782 in order to close the starter circuit for motor restarting. In so doing the operator moves flexible shaft 773, joined to shaft 776 toward bracket 784 compressing spring 781 so that ball 789 basing upon shaft lever 788 at opening 787 swings lever 788 in a clockwise direction from reverse gear to neutral position. Full withdrawal of handle 782 from dash 780, furthermore, brings electrical conductor ring 779, in line with the ends of terminal screws 767 and 768, to bear upon said terminal screws so that current flows from the grounded battery 790 via lead 791, closed ignition switch 792, lead 793, terminal screw 768, conductor ring 779, terminal screw 767, and lead 794, to grounded starter 795. Release of the handle 782 upon restart of the motor causes spring 781 to expand, breaking the starter circuit and returning flexible shaft 773 to the position shown in FIG. 24, so that shift lever 788 is freed for location at any of the in-gear positions.

Although handle 782 of FIG. 24 must be pulled to eject the shift lever to a neutral position and to restart the motor, it is obvious that a similar type of handle may be arranged to push, or may be swung pivotally, to accomplish the same purposes.

While the foregoing views, in general, indicate that the transmission shift lever is ejected from an in-gear position to neutral through the use of these mechanisms, it should be pointed out that these same and similar mechanisms can be employed to eject the shift lever to the "parking" position. This is possible where they are used in conjunction with automatic transmissions employing a parking-locking device which is withheld upon positioning the shift lever at "parking" from engaging the driving wheels through a locking pawl until the vehicle speed is reduced to approximately 2 or 3 miles per hour, at which speed the pawl engages through release of restricting hydraulic, solenoid, vacuum, air pressure, mechanical, or a like force, without damage to the driving mechanism of the vehicle. When one of these units is employed with this type of transmission, the driver is relieved of the additional duty of setting the handbrake, when stopping, or remembering to move the shift lever to the parking position, thereby automatically guaranteeing the safety of the vehicle against moving when left unattended.

Furthermore, while these neutral starter arrangements are shown to operate through cooperation with the shift lever itself, it should also be pointed out that they can be built into the transmission to cooperate with any shaft, valve, solenoid, governor, pump, or the like which can directly or indirectly cause the shift lever to be placed in a neutral position.

FIG. 25 shows a neutral positioning diaphragm assembly, generally designated as 800, in combination with a semi-automatic ignition-starter switch, generally designated as 801 wherein provision is made for manual movement of said switch to a position designated as "park."

Assembly 800 is composed of shells 802 and 803, gripping in tight seal through rivets 804 flexible diaphragm 805 at its outer periphery. Shell 802 carries vacuum port 806, connected to a suitable source of vacuum such as the manifold of a vehicle, and bore 807 at its axial center. In a collar 808 formed at the said axial center there extends from the outer surface through to the bore 807 a port 809 for connection to a vacuum reservoir, or directly to vacuum operated accessories such as windshield wipers and washers. Shell 803 is likewise apertured at its axial center with bore 810 and has firmly attached by means of collectively designated screws 811 adjacent said bore solenoid assemblies 812 and 813. Spring 814 within assembly 812 causes solenoid core 815 to bear upon cut 816 of shaft 817 which, as in previous embodiments, is slidably supported in the casing (suitable parking to prevent leakage being, of course, used but not shown herein in order to simplify the drawings). The shift passes through bores 810 and 807 of diaphragm assembly 800, while spring 818 causes solenoid core 819 to bear upon cut 820 of shaft 817. The diameter of shaft 817 is reduced at shoulder 821 for acceptance of flexible diaphragm 805, dished backing plates 822 and 823, and jam nut 824, adjacent to which is located cut 825 for communication of port 809 with sealed inner area of shell 802, when vacuum has moved shaft 817 toward shell 802, shaft 817 passing through opening 826 of shift lever 827 protruding from transmission case 817, being capped at the projected end by mushroom head 829. Spring 830 bears expandably against plate 823 and the inner surface of shell 802.

Rotatable face 831 of switch assembly 801 has mounted to its outer edge wings 832 and 833 of electrically nonconducting material over which are crimped electrically conducting channels 834 and 835. Non-conducting bracket 836, mounted to assembly 801 by means of screw 837, carries conductor screw 838 connected by lead 839 to grounded battery 840, conductor screw 841 for connection through lead 842 to the electrically operated accessories of the vehicle, and conductor screw 843, designated "park," and connected through lead 844 to a transmission or speedometer or the like operated governor switch, which connects through lead 846 to terminal screw 847 of grounded solenoid 813, and conductor screw 863 connected through lead 865 to lead 859, there being also carried at the end of bracket 836 a compression spring 848 for abutment with finger 849 mounted on the outer edge of rotatable face 831.

A second bracket of non-conducting material 850, mounted to assembly 801 by means of screw 851 carries conductor screw 852 connected by lead 853 to lead 839 for connection to grounded battery 840, conductor screw 854 for connection through lead 855 to the ignition circuit of the vehicle, conductor screw 856 designated "starter" and connected through lead 857 to the grounded starter 858, and conductor screw 864 connected through lead 859 to terminal screw 860 of grounded solenoid 812, there being also carried at the end of bracket 850 a compression spring 861 for abutment with finger 849 mounted on the outer edge of rotatable face 831. Slit 862 is cut into rotatable face plate 831 for the acceptance of an ignition key.

In the operation of the mechanism of FIG. 25 so far described when the ignition key is inserted in the slot 862 of plate 831 and turned clockwise from the position shown, electric current first flows from the battery 840 via leads 839 and 853 to terminal screw 852, through conductor channel 835 to terminal screw 854 and via lead 855 to the ignition circuit. Further clockwise turning of the key causes finger 849 to compress spring 848 and channel 835 to contact screws 856 and 864, causing current to flow through lead 857 to grounded starter 858 so that the motor of the vehicle starts. Current also flows through terminal screw 864 and lead 859 to grounded solenoid 812.

It is obvious that through knowledge gained from the previous illustrations of this invention that diapragm assembly 800 is shown in FIG. 25 to be in a motor operating position, vacuum having already withdrawn flexible diaphragm 805 and compressed spring 830 so that expanded spring 814 has seated core 815 in groove 816 to block the expansion of spring 830 when the motor is stopped and vacuum disappears. With energizing of solenoid 812 through turning of plate 831 to an extreme clockwise position, core 815 is lifted into solenoid 812 and spring 830 expands to throw shaft 817 from the low in-gear position shown, marked L, to neutral position marked N, and blocking cut 820 with end of core 819 for safe restarting of the motor, it being further assumed that the motor has stalled. Release of the ignition key, after the motor becomes self-operating, allows spring 848 to expand and break the contacts through screws 856 and 864, contact from the battery to the ignition lead 855 continuing for operation of the ignition circuit.

If, now, the driver stops the vehicle and turns the ignition key to "off" so that slot 862 assumes a perpendicular position, the ignition circuit is broken and the motor also stops. By turning the ignition key to an extreme counterclockwise position the driver may now automatically put the vehicle into a "park" condition by compressing spring 861 through contact with finger 849, current now flowing through terminal screw 863, leads 865 and 859 to terminal screw 860 and grounded solenoid 812 and through terminal screw 843 via lead 844, inert governor 845, and lead 846 to terminal screw 847 of grounded solenoid 813. With this flow of current core 819 is pulled from engagement with cut 820 and into solenoid 813 and core 815 is pulled into solenoid 812, compressing springs 818 and 814 and freeing shaft 817, so that spring 830 expands to move shaft 817 and shift lever 827 to the "park position," whereupon the transmission 828 is locked through a pawl with the drive shaft, this flow of current through solenoid 813, however, occurring only if the governor has stopped rotating. Release of the ignition key allows plate 831 to return to the "accessories" position and breaks the circuit through leads 846 and 859. Clockwise rotation of the ignition key cuts off flow of current to the accessories. Clockwise rotation of the ignition key to an extreme position again restarts the motor moving shaft 817 to the cocked position shown freeing shift lever 827 for in-gear positioning with subsequent vacuum flow through port 809 via cut 825, which permits operation of windshield wipers and the like, only after the movement of shaft 817 to the cocked position.

While FIG. 25 shows an automatic transmission wherein the parking position is adjacent to neutral position, FIG. 26 shows a transmission wherein reverse gear is located between parking and neutral, and illustrates a mechanism for positioning the shift lever in either neutral or parking for safe restarting of the motor, the mechanism illustrated being in a neutral position.

Vacuum diaphragm assembly 800, and switch assembly 801 similar to those used in FIG. 25, are also used in FIG. 26, and the numbering of like parts is identical, terminal screws 863 and 864 with interconnecting lead 865 being omitted. Shaft 817, in FIG. 26, no longer passes through an opening in the shift lever and no longer carries mushroom head 829, but is shown to abut shift lever 900 of automatic transmission 901, when said lever is in the neutral position shown. Solenoid core 902 of solenod 903, affixed to transmission 901 through screws 907 and 908, floats freely in the hollowed center of solenoid 903 except when current flows through 903. A lead 906 connects from lead 859 to terminal screw 905 on solenoid 903 which is grounded from terminal screw 904.

In the operation of the mechanism so far described in FIG. 26, manual positioning of the ignition through clockwise and counterclockwise rotation is identical with that of FIG. 25. However, when the ignition key is turned clockwise to its extreme position so that current flows to energize the starter and solenoid 812, current will also energize solenoid 903 to drive core 902 to the position shown. The movements of core 902 and shaft 817 shift from either left or right force lever 900 from either left or right to the neutral position shown, while the starter is in engagement, lever 900 being freed for in-gear positioning as soon as the circuit is broken through terminal screw 856 and the motor of the vehicle is in self-operation to create a vacuum condition within diaphragm assembly 800.

While no provision is made for cams to lift the shift lever over barriers, terraces, or detents, they may be incorporated where needed as in FIGS. 1, 3, 3A, 7, 8, and 9. While solenoids 812 and 813 are employed to block the path of the movement of shaft 817, it is obvious that mechanically operated trips may be substituted and connected to the rotatable plate 831 in a manner similar to that shown in FIG. 13. While solenoid 903 is shown to be adjacent shift lever 900 in FIG. 26 it may be remotely located and may be the heavy duty solenoid of the starter, connected thereto by a flexible shaft. Also, while diaphragm 800 is shown to be employed wherein the shift lever does not return to neutral until the starter is contacted, it is obvious that assembly 67, FIG. 1, can be substituted, and the shift lever can be made to return to neutral immediately upon stopping of the motor; or that the holding coil design of FIG. 21 may be substituted, the unit of FIG 1 or FIG. 21 being controlled by a circuit breaker as shown in FIG. 21 or by a governor as shown in FIG. 16; or the diaphragm units may be replaced by a direct acting solenoid or hydraulically pressured piston, there being flexibility in all the forms shown for interchange of elements to suit different conditions.

In one form of the automatic transmission (Hydramatic) the parking pawl is locted in the reverse gear position of the selector quadrant. If the vehicle is ingear when the motor stops, and the driver wishes to engage the parking pawl, it is necessary to first move the selector lever to neutral to unlatch the pawl before moving the lever to reverse gear position for engagement of the pawl. A special form of the neutral starting and parking unit has been worked out to accommodate these requirements, as shown in FIG. 27.

In FIG. 27, there is shown a vacuum diaphragm assembly generally designated as 920 mounted on the steering column 921 by means of screws 922 and 923, though it is obvious from preceding locations of the motivating unit that 920 could be placed at other points along the shift linkage. Shell 924 carries air port 925 threaded to engage an air filter and bearing bore 926 at its axial center, there being a recessed section 927 within its concave surface to engage one end of spring 928. Extension 929, through which bore 926 is cut, has openings 930 and 931 perpendicular to the axial center of shell 924, communicating the outer surface of 929 with 926, as well as opening 932 likewise communicating the outer surface of 929 with 926 into which is inserted screw 933, the inwardly projecting end of which rides in slot 934 cut into the surface of shaft 948. A second shell 936 engages shell 924 through rivets generally designated as 937 to grip and seal the outer periphery of flexible diaphragm 938 therebetween. A vacuum port 939 threaded to engage a vacuum line is formed on shell 936 along with bracket shoulders 940 and 941 for the reception of screws 922 and 923. A bearing bore 942 to slidably mount shaft 943 (no packing being shown though used, of course, to prevent leakage), is drilled through the axial center of shell 936 along with a larger threaded bore 943 formed in extension 944 for engagement with collar 945 carrying recessed ring area 946 cut into its inner surface for the entrapment of threaded and rotatable ring 947. The shaft 948, preferably of electrically non-conducting material, rides in bores 926 and 942, has two different diameters meeting at shoulder 949 where dished plates 950 and 951 grip to seal around the apertured center portion of flexible diaphragm 938 through the pressure of threaded nut 952 engaging the smaller diameter of shaft 943, plate 951 also bearing against one end of spring 928. Near one end of 948 cuts 953 and 954 are aligned with openings 930 and 931 along with the aforementioned cut 934. Near the opposite end and on the enlarged diameter of 948 there is mounted outwardly projecting pin 957, shown partially in broken lines, for engagement with a substantially V-shaped raceway 958 communicating the inner and outer surfaces of collar 959 which threadably engages ring 947 and slidably passes over shaft 948. An arm 960 is welded to one end of collar 959 and carries bifurcated arm 961 parallel to the shaft 948.

A spring 962 rides in recess 963 at the upper end of shaft 948 to abut the lower end of shifter shaft 964 carrying laterally extending arm 965 held by the prongs of bifurcated arm 961. A bearing housing 966 attached to steering column 921 by screws 967 and 968 serves to hold and guide shaft 964, along with another bearing, not shown, but formed integrally with shifter cage 969, held to steering column 921 by screws 970 and 971. Shift lever arm 972 is welded to the upper end of shaft 964 and is tensioned in a downward held position for engagement with detents 973, 974, 975, and 976 on surface 977 and raised terrace 978 through expansion of spring bearing against cage 969 and collar 980 formed integrally with the surface of shaft 964.

Solenoids 981 and 982 carry at their cores soft iron shafts 983 and 984 along with springs 985 and 986, respectively, shafts 983 and 984 projecting through openings 930 and 931 for engagement with cuts 953 and 954, screws 987 and 988 securing the assembly of the two solenoids to shell 924.

Groove 958 cut through the wall of collar 959 is flared at the end of the collar adjacent ring 947 for unrestricted lateral movement of pin 957 when shaft 948 is fully withdrawn to compress spring 928. At its apex, groove 958 carries detent 989 and on the shoulder of the inclined section outboard from ring 947, groove 958 is cut at 990 to run parallel with shaft 948 before terminating in a continuation of the inclined section.

Turning now to the operation of the structure of FIG. 27 so far described, shaft 948 is shown to be in an unrestrained and moving position, propelled by expanding spring 928 toward shell 936. When the pin 957 reaches the top of groove 958, the lever 972 will be in the extreme right end of the range cage, i.e., in the reverse-parking position. The pin 957 also can rotate arm 960 to produce the neutral position of the lever 972. When it is in the detent 989, the lever 972 will be rotated to the neutral position N. In this position, the solenoid shaft 983 engages cut 953 to releasably hold the shaft 948 so that the pin 957 remains in the detent 989. Full withdrawal downwardly of the shaft 948 results in the pin 957 passing into the lower funnel—like area 989' of the collar 959 so that the collar can be freely rotated to any of the in-gear selecting positions. The shaft 948 is held in this withdrawn position by engagement of shaft 984 with cut 954, and ejection of shaft 983 from cut 953 is facilitated by the taper on the top of the cut 953.

In FIG. 27, the solenoid shafts are disengaged from their cuts through the use of terminal contacts similar to those in FIGS. 25 and 26 to energize the solenoids 981 and 982. Fork 961 is shown to have moved selector lever 972 counterclockwise (viewed downwardly) so that detent 975 of range cage 969 is engaged and the side of the raised terrace area 978 is abutted by selector lever 972. Continued expansion of spring 928 will now cause pin 957 to travel along cut 990 thereby forcing spring 962 to compress against the end of shaft 964 to compress lighter spring 979 and lift selector lever 972 from engagement with detent 975 and the side of raised terrace 978, so that when pin 957 has completed its movement along cut 990, resumed counterclockwise pressure against the inclined shoulder of cut 958 will again rotate shaft 948 and cause selector lever 972 to move into engagement with detent 976, the parking position of range cage 969 when the motor of the vehicle is not operating.

To permit the above described movement, solenoids 981 and 982 have been energized through the use of an ignition switch assembly of the type used in FIG. 25, wherein turning of the ignition key counterclockwise to a position marked "park" on the switch completes an electrical circuit to energize both solenoids 981 and 982. In case the ignition key had been turned clockwise to a position marked "start" on the switch only solenoid 982 would have been energized so that shaft 948 would have moved pin 957 from a fully withdrawn position only as far as detent 989 on collar 959, rotating collar 959 and arm 960 clockwise to engage selector lever 972 with detent 973 at neutral in range cage 969, if not already so engaged. Upon the restarting of the motor in this safe, out-of-gear position, vacuum entering port 925 would then immediately cause shaft 948 to again move to a fully withdrawn position, once more permitting free in-gear manual positioning of selector lever 972.

In making the above, first described movement to a parking position, shaft 948 would first have moved shifter lever 972 clockwise to a neutral position before moving lever 972 counterclockwise to the parking position, thereby guaranteeing engagement of the parking pawl under motor-off conditions. After the above, first described movement of shaft 948 to the parking position, turning of the ignition key clockwise to "start" would cause shaft 948, due to accumulating manifold vacuum from the restarted motor, to fully withdraw, permitting shaft 984 to engage cut 954 in shaft 948, pin 957 causing collar 959 and arm 960 to rotate selector lever 972 clockwise to a neutral position for subsequent free manual in-gear positioning.

With the motor "off" and selector lever 972 in parking position, it may be desirable for the driver to manually move the shift lever to neutral for pushing or pulling of the vehicle. The operator then moves shift lever 972 clockwise to low gear position of range cage 969, pressures downwardly upon 972 to compress spring 962 and to move pin 957 through cut 990 so that lever 972 can be further moved clockwise to neutral position. At neutral position the operator continues the clockwise pressure to force shaft 948 slightly beyond the point of engagement of shaft 983 with cut 953 assuring expansion of spring 985 for such engagement, so that release of manual pressure will not cause shift lever 972 to return to parking position.

In a number of the forms of the eject-to-neutral starter arrangement already shown, externally powered means, such as fluid and electrical, have been employed to load the ejecting mechanism preparatory to the return-to-neutral movement. It is possible to substitute manually actuated power operated means for loading the ejecting mechanism, as shown in FIGS. 28 and 29.

In FIGS. 28 and 29 is shown a simplified type of the eject-to-neutral mechanism which may be installed conveniently as an accessory. A masking dial, generally designated as 1000, is centered over the customary ignition switch assembly 1001 herein shown to have three positions, namely "accessories," "off," and "on," reading in a clockwise direction, the starter being operated by the customary manual dash starter button. Ring 1002, preferably of electrically non-conducting material, formed with inwardly projecting shoulder 1003, and threaded at 1004, carries apertured ears 1005 and 1006 for attachment of assembly 1000 to the dash 1007 of the vehicle through screws 1008 and 1009 (FIG. 29). A collar 1010 threaded upon its periphery engages with ring 1002 at 1004 to form along with shoulder 1003 a raceway for ring 1011, preferably of electrical non-conducting material, which has in its recessed undersurface raised cam shoulders 1012 and 1013, 1012 rising to about twice the height of 1013, the inclined portion of cam 1012 being shown in profile in FIG. 28, the ignition switch being positioned at "off" in FIG. 28. Ring 1011 carries slot 1014 and has embedded in its periphery electrically-conducting plate 1015, and ring 1002 is apertured to receive electrically conducting screws 1016 and 1017, replacing the customary dash starter battery connections, aligned to contact plate 1015. Ring 1010 carries apertured and threaded shoulder 1018 formed along its inner shoulder to receive flexible shaft housing 1019, flexible shaft 1020 normally engaging detent 1021 on the face of the underside of ring 1011 when ignition switch 1001 is "off," as in FIG. 28.

Ignition key 1022 is shown to have attached through its carrying hole 1023 by means of screw 1024 a flexible steel tab 1025 having stamped reinforcing L-shaped channel 1026, finger 1027, and carrying hole 1028.

Flexible shaft housing 1019 at the end opposite to shoulder 1018 of ring 1010 threads into the lower end of bearing bore 1029 of bearing housing 1030 which is attached through ears 1031 and 1032 by means of screws 1033 and 1034 to steering column 1035. The upper end of bearing bore 1029 carries upon its rim a series of evenly spaced saw-type teeth 1036 for engagement with like teeth 1037 carried on collar 1038 secured to shaft 1039. An ear 1040 is attached to the outer shoulder of collar 1038 to engage one end of spring 1041 which is obliquely and downwardly tensioned through engagement at its opposite end to bracket 1042 secured to steering column 1035 by screw 1043 so that teeth 1036 and 1037 tend to engage, and collar 1038 is urged at all times in a clockwise direction (viewed downwardly).

Shaft 1039 which freely slides and rotates within bore 1029 and rests against the upwardly projecting end of flexible shaft 1020 terminates at its upward end in crank arm 1044 firmly attached thereto. Bearing collar 1045, attached to steering column 1035 through ears 1046 and 1047 by means of screws 1048 and 1049, slidably accepts shaft 1050 having attached at its lower end outwardly projecting arm 1051 and at its upper end outwardly projecting arm 1052, there being embedded in the free end of 1052 a socket, not shown, similar to 129 for carrying a fork similar to 130 of FIG. 3 to connect linkably with the selector lever under the steering column.

A range cage 1053 attached through ears 1054 and 1055 to steering column 1035 by means of screws 1056 and 1057 carries terraces 1058 and 1059 above depressed surface 1060, detents 1061, 1062, 1063, 1064, and 1065 being embedded therein, and also carries a bearing bore, not shown through which shaft 1050 passes and against the underside of which spring 1066 bears, the opposite end of spring 1066 bearing in turn against collar 1067 secured to shaft 1050, the range cage 1053 being in most cases a built-in part of the vehicle, and not necessarily a part of the herein described accessory neutral-positioning equipment, however, being shown to clarify the method employed for passing obstructions in the lateral movement of shift lever 1052 toward the neutral and parking positions. It will be appreciated that the letters "P," "N." etc. in the drawings designate "park," "neutral," etc., and are conventional symbols known to all drivers.

In the operation of the mechanism of FIGS. 28 and 29 so far described lever 1052 is shown to be in a reverse gear position, having been manually lifted to slide shaft 1050 upwardly and compress spring 1066 so that lever 1052 is able to engage detent 1065 on terrace 1059. In arriving at this position, lever 1052 has been manually swung counterclockwise (viewed downwardly) so that arm 1051 has forced arm 1044 and shaft 1039 into a counterclockwise movement causing teeth 1036 and 1037 to separate from engagement and re-engage in a ratcheting counterclockwise manner and causing spring 1041 to expand and hold teeth 1036 and 1037 in progressively meshing positions with increasing clockwise tension. Teeth 1036 and 1037 engage and hold at detents 1062, 1063, and 1064, as well as at 1065, so that once the shift lever 1052 is manually drawn to neutral, drive, low, or reverse positions, cocking shaft 1039 and arm 1044 to a tensioned condition, it becomes possible to move arm 1052 to any clockwise position and return it to the cocked position without spring resistance, the teeth 1036 and 1037 remaining in an engaged and holding position.

In FIG. 28, ignition switch assembly 1091 is shown to be in an "off" position, with key 1022 inserted into the lock portion of 1001 so that prong 1027 engages slot 1014 of ring 1011. If the driver now wishes to start the motor of the vehicle, tab 1025 is gripped and turned in a clockwise direction to bring key 1022 to an "on" position to close the ignition circuit, as shown in FIG. 29. Continued clockwise turning causes tab 1025 to twist about screw 1024 so that ring 1011 progresses farther in a clockwise direction than key 1022. The lower end of flexible shaft 1020 becomes disengaged from detent 1021 with the clockwise rotational movement of 1011 and is forced into housing 1019 by the cam 1013, so that the upper end of flexible shaft 1020 emerges from housing 1019 to raise shaft 1039 and teeth 1037 from engagement with restraining teeth 1036, as well as to lift shaft 1050 if its lower end abuts the upper end of shaft 1039. Spring 1041 is then free to contract and pull collar 1038, shaft 1039, arm 1044, arm 1051, shaft 1050 and arm 1052 in a clockwise direction, until 1052 is stopped by the shoulder of terrace 1058, the neutral position of the transmission.

With the clockwise rotation of ring 1011 to the extreme position shown in FIG. 29, plate 1015 is brought into contact with screws 1016 and 1017 to complete the circuit from the battery of the vehicle to the starter, thereby causing the motor to start.

As soon as the driver releases rotational tension from tab 1025, tab 1025 realigns itself with key 1022 causing ring 1011 to rotate in a counterclockwise direction and break the circuit between screws 1016 and 1017.

If the driver now turns the ignition key 1022 to "off" position to stop the motor and then continues such counterclockwise rotation to "accessories," further twisting tab 1025 counterclockwise about screw 1024, ring 1011 will bring cam shoulder 1012 into contact with the lower end of flexible shaft 1020 thereby forcing shaft 1020 into housing 1019 twice as far as did cam shoulder 1013 with the result that the upper end of flexible shaft 1020 will emerge twice as far as before, forcing the upper end of shaft 1039 to abut the lower end of shaft 1050 and thereby to compress spring 1066 and lift arm 1052 above the side shoulder of terrace 1058 so that spring 1041 can further contract and swing arm 1052 in a clockwise direction to the parking position, locking the parking pawl in the transmission with the drive shaft of the vehicle.

FIG. 30A shows a form of the invention having as an object to provide an automatic means for placing the vehicle in a parking condition when the driver removes the key from the ignition switch or makes other maneuvers prior to leaving the vehicle. In FIG. 30A there is shown another form of the neutral-parking positioner for the shift lever, wherein the parking position is located at the same position as the reverse gear. A tandem cylinder housing, generally designated as 1100, carries in cylinder 1101 piston assembly 1102, composed of piston ring 1103 gripped and sealed between threadably cooperating plate 1104 and recessed flange 1105 of piston rod 1106, rod 1106 passing through bearing opening 1107 in housing 1100 and terminating in eye 1108. A spring 1109 bears at one end against flange 1105 and the end wall 1110 in cylinder 1101, end wall 1110 also having airport 1111 to communicate the confined area behind piston ring 1103 with atmospheric pressure. Upon a protruding shank 1112 projecting outwardly at bearing opening 1107 there is mounted through screws 1113 and 1114 a solenoid 1115, a spring 1116, confined within the hollow center of 1115 tending to force soft iron core 1117 through opening 1118 in shank 1112 against rod 1106 and into cut 1119 cut into rod 1106 when cut 1119 is positioned as shown to permit such registry.

Shank 1112 furthermore carries on its outer surface electrical switch assembly 1120, shaft 1121 preferably of non-conducting material riding against rod 1106 through opening 1122 for engagement with detent 1123 cut into the surface of 1106 when the position of rod 1106 permits. Electrically conducting disc 1124 threadably attached to shaft 1121 bears against one end of spring 1125, in alignment with conductor screws 1126 and 1127 carried in cover 1128 of non-conducting material, spring 1125 seating at its opposite end in recess 1129 of cover 1128 which is attached to shank 1112 by means of screw 1130.

Cylinder housing 1100 carries in the other cylinder 1150 formed adjacent to cylinder 1101, piston assembly 1131 composed of piston ring 1132 gripped and sealed between threadably cooperating plate 1133 and recessed flange 1134 formed integrally with piston rod 1135, rod 1135 passing through bearing 1136 in end 1137 of cylinder 1150, having airport 2000. Rod 1135 is drilled a substantial part of its length at 1135 to accept one leg of T-shaped rod 1138, and is capped by threadably attached cylinder 1139 containing spring 1140 to bear expandably against the leg of rod 1138 projecting through slot 1141 cut lengthwardly through one wall of cylinder 1139. Spring 1199 is confined between recessed flange 1134 and end wall 1137. Rod 1142, carried in a bearing 1143 formed in the housing 1100 adjacent to end walls 1110 and 1137 registers at one end with detent 1144 cut into the surface of piston rod 1106 and under certain other conditions, later to be explained, with detent 1145 cut into the surface of piston rod 1146.

End caps 1147 and 1148 are threaded into the openings of cylinders 1101 and 1150 to seal the cylindrical areas for fluid pressure application, cap 1148 having port 1149 threaded for tubular connection to a pressure source, port 1151 joining between cylinders 1101 and 1150 to permit fluid movement between the cylinders. A stanchion 1152, formed integrally with housing 1100, projects outwardly between cylinders 1101 and 1150 and terminates in eye 1153 to engage crank 1154 pivotally at a point between its eye-formed extremities 1155 and 1156. Right angled shaft 1157 joints flexibly at one end to eye 1155 and at the other end to eye 1108 formed in the end of piston rod 1106, while shaft 1158 joins flexibly at one end to eye 1156 and at the other end through eye 1159 to shaft 1160 which rides in bearing opening 1161 cut through housing shoulder 1162 formed on the side of housing 1163. Housing shoulder 1162 is also apertured for the acceptance of screws 1163 and 1164 for attachment of housing 1100 and component parts to the vehicle frame or to the transmission for control of shift lever 1165, housing 1100 herein being shown directly attached to the transmission case 1166 so that the outward end of lever 1165 may be abutted by the T-end of shaft 1138 or by the free end of shaft 1160.

An ignition switch housing 1170 of electrically non-conducting material is shown to have embedded in its closed end terminal screws 1171 and 1172 and to have opening 1173 for the acceptance of electrically non-conducting shaft 1174 enlarged at one end to permit threading and connection to electrically conducting disc 1175 aligned for contact with screws 1171 and 1172. A cap 1176 engages housing 1170 and bears against one end of spring 1177 at recess 1178 to pressure disc 1175 toward housing 1170. A collar 1179 threads to the opposite and open end of housing 1170 for attachment to the dash of the vehicle and to confine rotatable ignition barrel 1180, the latter being apertured at its inner and enclosed end to accept shaft 1174. Ignition key 1181 is shown to be inserted in ignition barrel 1180 pressuring the end of shaft 1174 to compress spring 1177, there being a detent 1182 on one surface of key 1181 to seat ball 1183, pressured by spring 1184 confined within barrel 1180, FIG. 30B, to resist the expansion of spring 1177. Key 1181 carries the customary cuts 1185 for engagement with the customary ignition barrel tumblers, not shown, and is wedge shaped at its end 1186 to force ball 1183 against spring 1184 when the key is inserted into the barrel.

Cap 1176 is apertured at 1187 to permit connection of terminal screw 1171 with grounded battery 1188 through lead 1189, and is apertured at 1190 to permit connection of terminal screw 1172 with terminal screw 1191 on solenoid 1115 through lead 1192. Terminal screw 1193 on solenoid 1115 connects to terminal screw 1127 in switch cover 1128 through lead 1194, terminal screw 1126 grounding the battery circuit.

As shown in FIG. 30C, an alternate circuit includes manual switch 1195 which joins to the end of lead 1189 and through lead 1196 joins to governor switch 1197, which in turn joins to grounded battery 1188 through lead 1198.

In the mechanism so far described, piston assemblies 1102 and 1131 are shown to be in a motor operating position wherein fluid pressure from the operating oil pump, the water pump, an air pressure pump, a pump within the automatic transmission such as that used to effect ratio changes within the same, or the like, has caused the two assemblies to compress springs 1109 and 1199, so that soft iron core 1117 through expansion of spring 1116 engages cut 1119. Cross shaft 1142 is shown to be engaged at one end with detent 1144 further locking piston shaft 1106 in the position shown and to be riding slidably at the other end against the surface of piston shaft 1146 to effect such locking. With the motor in operation, as described, shift lever 1165 is free for manual positioning so that it may be placed in reverse (or parking), as shown, or moved manually to any other position within the range cage, such movement being limited only through contact at its extremities with the free end of shaft 1160 or the T-end of 1138 which it is shown to abut.

As soon as the motor stops, fluid pressure from the pump source in cylinders 1101 and 1150 disappears so that spring 1199 is free to expand and drive piston assembly 1131 toward end insert 1148, air entering cylinder 1150 via airport 2000. T-arm 1138, carried in shaft 1146 follows due to the expansion of force spring 1140 so that shift lever 1165 is rotated counterclockwise from the reverse (or parking) position shown to the neutral position, to be thereupon abutted by both 1138 and the free end of shaft 1160, so that if the driver wishes to restart the motor the transmission will be in a safe, out-of-gear position.

Assuming the motor has been stopped through turning of the ignition key 1181 to "Off" position, the position represented in FIGS. 30A and 30B, it now becomes possible for the driver to withdraw the key, whereupon shaft 1174, urged by expanding spring 1177, follows in the direction of the withdrawing key 1181 so that disc 1175 contacts terminal screws 1171 and 1172 to close the battery circuit between leads 1189 and 1192. Since disc 1124 in riding the surface of shaft 1106 is already in contact with terminal screws 1126 and 1127, the battery circuit via solenoid 1115 is completed so that solenoid core 1117 is lifted from engagement with cut 1119 in piston shaft 1106, permitting spring 1109 to expand and drive piston assembly 1102 toward end insert 1147, air entering cylinder 1101 through airport 1111. Since piston assembly 1131 is already seated against end insert 1148, detent 1145 is in position for registry with the lower end of cross shaft 1142, so that movement of shaft 1106 toward end insert 1147 immediately ejects the upper end of shaft 1142 from detent 1144 to lock shaft 1142 with detent 1145 in piston shaft 1146. When piston assembly 1102 has moved completely across cylinder 1101 to rest against end insert 1147, shaft 1121, induced by expanding spring 1125, moves into engagement with detent 1123 to break the contact of disc 1124 with terminal screws 1126 and 1127 thereby allowing soft iron core 1117 to ride on the surface of shaft 1106, the flow of current from the battery having now been cut off.

This operational movement of piston assembly 1102 toward end insert 1147 causes right angled shaft 1157 to move in the same direction to rotate crank arm 1154 counterclockwise about pivot 1153, and to drive linked shafts 1158 and 1160 toward lever 1165, thereby forcing shift lever 1165 into parking position through yielding of spring 1140, weaker than spring 1109, and the following of the T-end of shaft 1138 along cut 1141 in cylinder 1139.

In this mechanism, it is assumed that an ignition switch assembly of the type used in FIGS. 25 or 26 is employed, so that key 1181 may be turned counterclockwise, as viewed in FIGS. 25 or 26, to complete the electrical circuit to actuate solenoid 1115 and place shift lever 1165 in parking position. Furthermore, to restart the motor, it is assumed that by turning the key clockwise to an extreme position the starter will be engaged and upon release of the key the starter will disengage leaving the ignition circuit completed for firing of the spark plugs. As soon, therefore, as the motor is restarted by turning the ignition key clockwise, fluid pressure returns to cylinders 1101 and 1150. Because cross shaft 1142 is locked with detent 1145 in shaft 1146, piston assembly 1131 remains in contact with end insert 1148 and only assembly 1102 moves across its cylinder 1101 to compress spring 1109, rotating crank arm 1154 clockwise and moving link shafts 1158 and 1160 away from shift lever 1165, so that T-shaped arm 1138 presses upon lever 1165 through expansion of spring 1140 to force lever 1165 from park position to neutral position, a safe, out-of-gear position. As soon as piston assembly 1102 has completed its movement away from end insert 1147, detent 1144 registers with the upper end of cross shaft 1142, so that fluid pressure within cylinder 1150 impinging upon piston assembly 1131, forces shaft 1142 upwardly out of engagement with detent 1145 to permit assembly 1131 and shaft 1146 to move away from end insert 1148 thereby moving T-shaped shaft 1138 away from the neutral-positioned shift lever 1165, and thereupon permitting free, unobstructed manual positioning of shift lever 1165 to any in-gear position.

Since one of the prime objects of this type of mechanism is to automatically place the transmission shift lever in parking position, other innovations of this idea may be incorporated if, as shown in FIG. 30C, a manual switch 1195 and/or a governor switch 1197 are added to the solenoid circuit. With this arrangement the manual switch may be closed by the driver when he performs one of the customary acts when leaving the car, such as when opening the door, the governor switch preventing operation of the parking position device until the vehicle has stopped moving.

While the parking switch operating with the ignition switch herein is shown to be used with tandem fluid pressure pistons, it should be pointed out that it will work equally as well with the other types of neutral positioners disclosed in this application, such as manual, spring loaded, vacuum, or direct solenoid, and that the switch plunger engaging the end of the ignition key may be manually motivated with suitable flexible shaft connections to the piston assembly as a substitute for the solenoid herein used. It should further be pointed out that the tandem piston assembly may likewise be used with other ignition switch combinations such as those shown in FIGS. 25 and 26.

In FIG. 17A there is shown an hydraulically powerized neutral and parking positioning mechanism which, in an out-of-gear position permits closing of the starter switch through movement of the shift lever toward an in-gear position, thereby combining the separate manual effort to place the transmission in gear with the usual separate manual effort to engage the starter, so that the manual effort to start the motor is rendered virtually automatic before in-gear positioning and controllable through the decision of the operator. Hydraulic cylinder assembly 1201, attached to automatic transmission 1202 by means of screws collectively numbered 1203 and bracket ears 1204, carries in cylinder barrel 1205, a flexible piston ring 1206 gripped and sealed between threaded ring 1207 and shouldered flange 1208 of piston rod 1209. Sealing ring 1207 is laterally drilled with passages 1210 and 1211 for free flow of fluid within the confined area of barrel 1205 when sealing ring 1207 abuts end cap 1212, as shown. End cap 1212, threaded to one end of barrel 1205, carries port 1213, drilled perpendicular to the axial center, port 1213 terminating at the outer shoulder of 1212 in threaded opening 1214 for connection to a suitable source of fluid pressure, constant above a minimum while the motor is running, and terminating at the inner end in cavity 1215 located at the axial center of 1212 and communicating with the confined area of barrel 1205 through smaller sized opening 1216. Port 1217 communicates cavity 1215 with passage 1218, drilled, threaded, and plugged with plug 1219 adjacent the outer end surface of 1212 to confine check ball 1220 behind spring 1221 port 1222 seating ball 1220 and further communicating passage 1218 with the opposite inner end surface of 1212 and the confined area of barrel 1205. A shaft 1223 threaded into one end of piston rod 1209 carries head 1224, larger in diameter than plug 1223 but slightly smaller than opening 1216 for free entry into cavity 1215.

Piston rod 1209 preferably of electrically non-conducting material, carries at one point upon its outer surface detent 1225, perpendicular at one end to serve as a stop and pitched at the opposite end to serve as a raceway and is drilled axially from one end for a portion of its length to form area 1226 and to receive shaft assembly 1227. Holes 1228 and 1229 are drilled perpendicular to the axis, between the inner and outer surfaces of rod 1209, at diametrically opposite locations, to receive electrically conducting plugs 1230 and 1231 in a press fit. Collar 1232, threaded on its outer periphery, for engagement with the inner surface 1226 of rod 1209, confines spring 1233 and shaft assembly 1227 within area 1226, assembly 1227, being composed of electrically non-conducting portions 1235 and 1236 threaded to cooperate with electrically conducting portion 1237, portion 1236 being reduced in diameter for the acceptance of spring 1233 and threaded at the projecting end to engage end collar 1238. A shift arm 1239 entering transmission 1202 at pivotal point 1240 is flexibly joined to shifter linkage 1241 at pivotal point 1242, and is apertured with area 1243 to pass over and clear piston rod 1209, there being an arced earlike side 1244 for frictional contact with end collar 1238.

Piston rod 1209, furthermore, rides in bearing 1245 cut through the axial center of end cap 1246, threadably engaging cylinder barrel 1205, spring 1247 bearing at one end against cap 1246 and at the other end against flange 1208. Air port 1248 communicates the confined area behind flange 1208 within barrel 1205 with atmospheric pressure. End cap 1246 is drilled from the outer surface toward the axial center to form routed area 1249, threaded to receive flexible shaft housing 1250, confining spring 1251 between said housing 1250 and collar 1252 integral with the end portion of flexible shaft 1253 carried in housing 1250, and projecting through drilled area 1254 connecting area 1249 and bearing area 1245. Projection 1255 formed on the end of cap 1246 has diametrically opposite drilled and threaded holes 1256 and 1257 into which are threaded electrically non-conducting cores 1258 and 1259, in turned center-drilled and threaded to receive electrically conducting screws 1260 and 1261, electrical leads 1262 and 1263 joining thereto for connection with the starting motor circuit in a manner already shown and described in previous illustrations.

In FIG. 17A there is also shown ignition switch assembly 1264 carried in the dash 1275 of the motor vehicle through opening 1265, threaded collar 1266 cooperating with cylinder housing 1267 to grip the edge of opening 1265. Snap ring 1268 confines cylinder barrel 1269 at one end within bearing opening 1270 of housing 1267, while smaller diameter bearing opening 1271 confines barrel 1269 at the opposite end, the customary locking pawls and ignition switch components not being shown. As in FIG. 30B and C an ignition key 1272 is shown to be inserted into the customary slot opening of barrel 1269 and to have upon its face detent 1273 for engagement with a spring-loaded ball to frictionally hold said key 1272 from ejection from said barrel 1269 as shown in FIG. 30B and C. A bracket 1274 is held firmly against the backside of the dash 1275 by means of rivet 1276, bracket 1274 having a depending U-shaped arm through which have been drilled aligned holes 1217 and 1278. Small cylinder 1279 rides in hole 1277, spring 1280 held between bracket 1274 and cap end 1281 of cylinder 1279 urging cylinder 1279 toward switch assembly 1264, and threadably cooperating center-drilled collar 1282 preventing escape of cylinder 1279 from hole 1277, as well as ball end 1283 of flexible shaft 1253 loosely held within end-drilled area 1284 of small cylinder 1279. The upper threaded end of flexible shaft housing 1250 projects through hole 1278 of bracket 1274 and is locked securely in this position by center-drilled nut 1285.

In the operation of the mechanism so far described in FIG 17A the hydraulic cylinder assembly 1201 of the neutral-parking device is shown to be in a fluidly unpressured condition, spring 1274 having expanded to drive piston ring 1206 and related parts toward end cap 1212, so that sealing ring 1207 abuts end cap 1212, and shift arm 1239 has been swung, through contact with ear 1244 of collar 1238, to "parking" position. Ignition key 1272 is shown to have been fully inserted into the slot opening of ignition barrel 1269 and to be held there through friction of a spring loaded ball engaging detent 1273, key 1272 being an ignition "off" position. Small cylinder 1279, furthermore, is shown to be pressured by the inwardly projecting end of key 1272 so that spring 1280 is compressed and flexible shaft ball end 1283 is free for movement away from key 1272 in area 1284, such movement of 1283 being possible when detent 1225 on piston rod 1209 registers with the lower end of flexible shaft 1253 and compressed spring 1251 is released for expansion, thereupon locking piston rod 1209 at the neutral position.

If, now key 1272 is turned clockwise in the customary manner to an ignition "on" position, the ignition circuit will be completed and the starter circuit will likewise be completed except for the section herein shown between leads 1262 and 1263. To complete the starter circuit the driver of the vehicle now pulls the steering column mounted shift lever toward an in-gear position, linkage 1241 forcing shift arm 1239 counterclockwise to force collar end 1238 in the same direction through contact with ear 1244, thereby compressing spring 1233 against the heavier unyielding resistance of spring 1247 and sliding shaft assembly 1227 in the same direction, closing the gap shown at indicating arrow (A) and causing electrical conducting collar 1237 to contact electrical conductor inserts 1230 and 1231 to complete the starter circuit and so start the motor.

As soon as the motor is started, fluid pressure is developed within the automatic transmission by means of a shift-controlling pump although it is possible to utilize pressure from other motor operating sources. Generally speaking, this transmission pressure is held until an upshift is made and then released, but it should be obvious that a minimum pressure can be maintained, as long as the motor is operating, through the addition of a residual check valve to the transmission pump on the pressure side of which cylinder assembly 1201 operates. As soon as this fluid pressure enters cylinder assembly 1201 by way of port 1213, piston ring 1206 and its related parts are driven rapidly toward end cap 1246. As piston rod 1209 arrives at neutral position, this motion is substantially slowed down due to the restricted flow of fluid between reduced diameter 1216 of cavity 1215 and head 1224 of shaft 1223, so that if the driver continues with an in-gear pressure upon the steering column mounted shift lever, the slow, responsive movement at the neutral position will provide a signal that the motor has begun to operate, and he will have time to decide whether to release the pressure to keep the lever in neutral position or to follow through to an in-gear selection. As soon as head 1224 has moved beyond reduced diameter 1216, movement of piston ring 1206 and related parts resumes at a higher rate of speed to fully compress spring 1247 against end cap 1246 for unrestricted in-gear positioning.

With the motor operating turning of the key to "off" position breaks the ignition circuit and stops the motor. Fluid pressure within assembly 1201 drops and spring 1247 expands to drive piston ring 1206 and related parts toward end cap 1212. Since spring 1251 is compressed the lower end of flexible shaft 1253 drops into detent 1225 as soon as piston rod 1209 brings 1225 opposite 1253 so that end collar 1238 forces shift arm 1239 if it has previously been positioned at an in-gear location only as far as the neutral position. At this point the driver may now remove key 1272 from the switch barrel 1269 and in so doing allow heavier spring 1280 to expand and force the contraction of lighter spring 1251 by the upward movement of flexible shaft 1253, thereby breaking the engagement of the lower end of flxeible shaft 1253 with detent 1225, and permitting spring 1247 to expand further and force piston ring 1206 and related parts to draw shift arm 1239 to the parking position, as illustrated. Such movement requires the passing of head 1224 past reduced diameter 1216. Since temporary fluid pressure would build up within the confined area of cylinder 1205 to restrain the movement of piston ring 1206 and related part into a parking position, this pressure is relieved and bypassed through flow of fluid by way of port 1222, around unseated ball check 1220 and compressed spring 1221, through area 1218, through port 1217 into cavity 1215.

If, instead of removing the key 1272 to permit the transmission to lock in parking position, the driver chooses to restart the motor while the transmission is in neutral, the key is turned to "on" and the steering column mounted shift lever is pressured toward an in-gear position to close the gap shown at indicating arrow (b) to cause conducting collar 1237 to contact conductor inserts 1230 and 1231 to complete the starter circuit and restart the motor, there being a slow yielding of the lever toward the in-gear positions as soon as the motor becomes self-operating, providing a signal to the driver that he may release the lever to stay in neutral of follow-through to position the transmission at R, L or D, as soon as piston ring 1206 and related parts resume speed toward end cap 1246. Since spring 1233 has greater expansive force than the resistance found in the vehicle built-in detents employed for holding the shift lever in selected positions, it should be pointed out that with expansion of 1247, which in turn, has substantially greater expansion force than spring 1233. Spring 1233 will yield only moderately when resisted by shift arm 1239 in the movement back to neutral or parking, and the starter circuit by way of conductor collar 1237 and inserts 1230 and 1231 will not be closed.

Figure 17B:
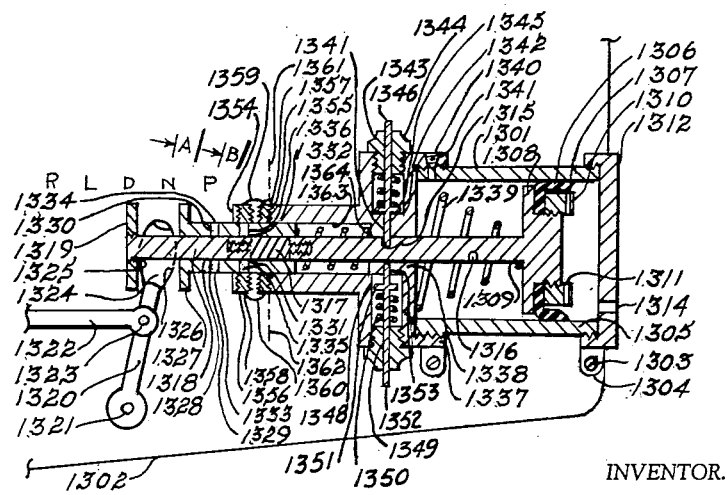
FIG. 17B is a cross-sectional view of a vacuum neutral-parking positioner combined with a manually operated starter control for use with the ignition switch parking control assembly depicted in FIG. 31.

In FIG. 17B there is shown an innovation of the mechanism of FIG. 17A, the motivating power being, in this case, vacuum from the manifold of the motor, and the motor restarting movement of the shift lever being away from the in-gear positions instead of toward them.

Vacuum cylinder assembly 1301, attached to automatic transmission 1302 by means of screws collectively numbered 1303 and bracket ears 1304, carries in cylinder barrel 1305 a flexible piston ring 1306 gripped and sealed between threaded ring 1307 and cooperating shouldered flange 1308 piston rod 1309 preferably of electrically non-conducting material. Sealing ring 1307 is laterally drilled with passages 1310 and 1311 for free flow of fluid within the confined area of barrel 1305 when sealing ring 1307 abuts end cap 1312. End cap 1312 carries airport 1314 between the inner and outer surfaces for free movement of atmospheric pressure to and from the interior of cylinder barrel 1305 between piston ring 1306 and end cap 1312.

Piston rod 1309 carries at one point upon its outer surface detent 1315 perpendicular at one end to serve as a stop and pitched at the other end to serve as a raceway, and carries at another point upon its surface detent 1316 perpendicular upon both shoulders to serve as a stop. At the end opposite to shouldered flange 1308 piston rod 1309 is center drilled axially for a short distance and threaded to receive a threaded reduced-diameter projection of electrically conducting collar 1317, a similar projecting end cooperating threadably with electrically non-conducting shaft 1318 which is threaded upon its outer end to receive end collar 1319.

A shift arm 1320 entering transmission 1302 at pivotal point 1321 is flexibly jointed to shifter linkage 1322 at pivotal point 1323 and is apertured at area 1324 to pass over and clear shaft 1318, there being arched ear-like sides 1325 and 1326 for frictional contact with end collar 1319, as well as with flange end 1327 of axially drilled shaft 1328 which is passed over shaft 1318 conducting collar 1317, and piston rod 1309 and which carries in diametrically opposite paired holes 1329, 1330 and 1331, 1332, electrically conducting plugs 1333, 1334 and 1335, 1336.

Shaft 1309, rides in end cap 1337 by way of bearing 1338 cut through the axial center of 1337 which threadably engages one end of cylinder barrel 1305, spring 1339 bearing at one end against end cap 1337 and at the other end against flange 1308 of piston rod 1309. At one point on the outer periphery of end cap 1337, and through the threaded portion for engagement with cylinder barrel 1305, there is drilled and threaded port 1340 for the acceptance of a suitable tubing connecting to the source of vacuum, and there is drilled through the wall of cylinder barrel 1305 a port 1341 located to register with port 1340 when end cap 1337 has been threadably engaged with cylinder barrel 1305.

End cap 1337 is drilled from the outer periphery toward the axial center to form routed area 1342 which is threaded to receive flexible shaft housing 1343, confining spring 1344 between said housing 1343 and collar 1345 integral with the end portion of flexible shaft 1346 connected to the ignition switch assembly shown in FIG. 17A in the same manner as flexible shaft 1253 of FIG. 17A the lower end of flexible shaft 1346 projecting through drilled area 1347 connecting to bearing area 1338.

At another point on its outer periphery end cap 1337 is drilled toward the axial center to form routed area 1348 which is threaded to receive flexible shaft housing 1349, confining spring 1350 between said housing 1349 and collar 1351 integral with the end portion of flexible shaft 1352 projecting through drilled area 1353 connecting to area 1338, the lower end of 1352 connecting to the accelerator pedal in a manner already shown and explained in previous illustrations.

Projection 1354, formed on the end of cap 1337 has diametrically opposite drilled and threaded holes 1355 and 1356 into which are threaded electrically non-conducting cores 1357 and 1358, in turn center-drilled and threaded to receive electrically conducting screws 1359 and 1360, electrical leads 1361 and 1362 joining thereto for connection with the starting motor circuit in a manner already shown and described in previous illustrations. Bearing area 1338 is recessed from the outer end of projection 1354 with larger drilled area 1363 to receive spring 1364 and to provide a bearing support for axially drilled shaft 1328.

In the operation of the mechanism so far described in FIG. 17B the vacuum cylinder assembly 1301 shown to be in a fluidly unpressured condition, spring 1339 having expanded to drive piston ring 1306 and related parts away from end cap 1337 toward end cap 1312, this movement having been halted by the engagement of the lower end of flexible shaft 1346 with detent 1315 in piston rod 1309, it being assumed that the ignition key has been inserted in the ignition switch, as in FIG. 17A, so that spring 1344 has been free to expand and force the lower end of flexible shaft 1346 downwardly.

If the ignition key now is turned to the "on" position, the ignition circuit is completed and the starter circuit is also completed except for the section herein shown between leads 1361 and 1362. To complete the starter circuit the driver now pushes the steering column mounted shift lever toward the parking position with a moderate pressure, so that connecting linkage 1322 forces shift arm 1320 in a clockwise direction and flange 1327 of collar 1328, through contact with ear 1326 of shift arm 1320 slides toward end cap 1312 to compress spring 1364 closing the gap shown at indicating arrow (A) and causing conducting inserts 1335 and 1336 to contact terminal screws 1359 and 1360 as well as conductor collar 1317 to complete the starter circuit and start the motor. As soon as the motor is started, vacuum develops within the manifold to create differential pressure between flange 1306 and sealing ring 1307 within assembly 1301 to move piston ring 1306 and related parts toward end cap 1337, fully compressing springs 1339 at the same time breaking the starter circuit through movement of collar 1317 and allowing shift arm 1320 complete freedom for in-gear positioning through pressure in the opposite direction on the steering column mounted shift lever. With spring 1339 fully compressed against end cap 1337 the upper end of flexible shaft 1352 is in a position through expansion of spring 1350 to engage detent 1316, which, as in the similar forms of this portion of the mechanism already explained in previous illustrations occurs whenever the accelerator is depressed, thereby locking piston rod 1309 and all connected parts in a fully vacuum withdrawn position, at which time, due to motor loaded conditions, the vacuum temporarily drops.

With the release of the accelerator and the return of intensified vacuum conditions within the manifold flexible shaft 1352 withdraws from engagement with detent 1316 spring 1350 becoming compressed by the heavier accelerator return spring, not shown but explained in previous illustrations on this portion of the device, so that if the motor stalls or is turned off, vacuum disappears within the manifold and spring 1339 is free to re-expand within cylinder assembly 1301 and to drive piston ring 1306 and its related parts toward end cap 1312 until the lower end of flexible shaft 1346 again engages detent 1315, through expansion of spring 1344 drawing shift arm 1320 to the neutral position, if not already so located as shown in FIG. 17B.

If, after turning the ignition key to "off," the key is now withdrawn from the ignition switch, flexible shaft 1346 will be lifted from engagement with detent 1315, in a manner already explained in FIG. 17A permitting spring 1339 to expand further to move piston ring 1306 and related parts toward end cap 1312 until ring 1307 abuts end cap 1312 thereby moving shift arm 1320 to parking position and bringing conductor inserts 1333 and 1334 into close proximity with terminal screws 1359 and 1360 as well as conductor collar 1317, so that if the steering column mounted shift lever is pressured away from an in-gear position when it is located in a parking position, spring 1364 will be compressed, the gap shown at indicating arrow (B) will be closed and provided the key has again been inserted in the switch and turned to "on," the starter circuit will be closed to start the motor. As soon as the motor restarts and vacuum accumulates in the manifold, piston ring 1306 and its related parts will again be drawn toward end cap 1337 to fully compress spring 1339 for free in-gear positioning of shift arm 1320 through movement of the steering column mounted shift lever in the opposite direction to that employed for starting the motor.

Although FIGS. 17A and 17B show two separate methods for manually closing the starter switch, namely, by pressuring the shift lever either toward an in-gear position or away from an in-gear position, it should be pointed out that these two motor starting arrangements can be combined in one unit so that the operator may have a choice of pressuring the shift lever either toward an in-gear position or away from an in-gear position.

While only hydraulic and vacuum methods for returning the shift lever to neutral position are shown in FIGS. 17A and 17B other methods such as electrical, air pressure spring-loaded, manual or others may be substituted with appropriate innovations in the designs of such devices already shown and described in previous illustrations herein, and there may likewise be latch releasing means other than mechanical or solenoid in combination with the ignition switch assembly for moving the shift lever to the parking position.

In FIGS. 31, 32, and 33 there is shown a vacuum powerized neutral and park positioning mechanism with a holding coil, which, in an out-of-gear position permits the driver to close the starter switch by pulling downwardly on the gearshift lever, as shown in FIG. 31, thereby combining with the movement to move the vehicle into a gear engaged condition the usually separate manual effort to engage the starter, thereby giving automatic effect to a manually controllable starter.

Vacuum cylinder assembly 1402, FIG. 31, is firmly attached through a clamp, not shown, to the steering column housing 1445, and is located behind the dash of the vehicle, not shown, and thereby hidden from the driver's view. Cylinder barrel 1403 slidably carries within it a piston ring 1401, gripped and sealed between threaded ring 1405 and shouldered flange 1406. End cap 1407, threaded to one end of cylinder barrel 1403, carries air port 1408, and is drilled at its axial center with piston rod bearing opening 1409 on an outwardly projecting shoulder of which there is formed a threaded collar 1410 for cooperation with an electrically non-conducting extension 1411, also drilled with a bearing opening 1412. Extension 1411 has formed at its outer extremity bearing collar 1413 through which is drilled bearing opening 1414 perpendicular to the axial center of bearing opening 1412, and has formed in a depending projection at the same end ignition switch housing 1415, shown in the cross sectional detail of ignition switch assembly 1416, in FIG. 32. Through apertures suitably drilled perpendicular to the axial center of bearing opening 1412 extension 1411 also carries two sets of embedded electrically conducting terminal plugs 1418 and 1420, and set 1417 and 1419, the sets being spaced by substantially the width of tooth 1428.

Flange 1406 is threaded to one end of electrically non-conducting piston rod 1421, into the same end of which is also threaded iron core 1422, responsive to the magnetic attraction of the electrical holding coil of this mechanism, later to be explained in detail. The piston rod 1421 has a sliding but fluid tight bearing fit in bores 1409 and 1412. At one point along the surface of piston rod 1421 through apertures perpendicular to its axial center there are inserted electrically conducting plugs 1423 and 1424, terminating at their inner ends at axially drilled bearing bore 1425. Near the opposite and outer end of piston rod 1421 there is cut depressed raceway 1426 and at another section of the surface raceway 1427 having outwardly projecting tooth 1428, pitched upon its right hand (FIG. 31) shoulder with respect to the axial center of piston rod 1421 and perpendicular upon the opposite shoulder. A shaft, 1429, preferably of electrically non-conducting material, slides freely within bearing opening 1425, and at one point upon its surface carries in groove 1430, electrically conducting ring 1431 for electrical contact with plugs 1423 and 1424, shaft 1429 bearing at its inner end against compression spring 1432 and terminating at its outer end in ball head 1433 which rides slidably in hood 1434 firmly attached at its base to shift lever shaft 1435, encasing the steering shaft of the vehicle.

Shift lever 1436 is pivotally attached to shaft 1435 through raised ears, collectively numbered 1437, one of which is shown, for actuating rotational movement of shaft 1435, the latter terminating in the customary manner by attachment to linkage at its lower end below the floorboards, and not shown, for control of the transmission. A range cage 1438 having a barrier 1439 between parking and neutral positions, and a terrace 1440 before reverse gear, to normally interrupt the lateral movement of tooth 1441 attached to shift lever 1436, is shown mounted on the upper end of shaft 1442, carried in bearing opening 1414 of collar 1413 and in bearing opening 1443 of housing 1444, attached to steering column casing 1445, shown only in fragment, there being a compression spring 1481 between housing 1444 and collar 1446 attached thereto to urge shaft 1442 downwardly for contact of the lower end of shaft 1442 with raceway 1426, the position in which it is shown to be in FIG. 31.

At the end opposite to end cap 1407 cylinder barrel 1403 threadably engages end cap 1447, which confines spring 1482 against flange 1406. End cap 1447 carries, threaded into its open center, electrical solenoid assembly 1448, the attaching base of which is preferably of non-conducting material and in turn has threaded into its open center magnetic core 1449. End cap 1447 also carries, as an integral part thereof, delaying valve assembly 1450. A cover plate section identical but opposite to, and removable from the portion shown completes the assembly. Threaded vacuum port 1451 connects with right-angled channel 1452, which terminates at one side of cylinder 1453 in which rides step-shouldered valve 1454, backed by spring 1455, shown to be in a restricting position for communication of channel 1452 and the oppositely located port 1456 connecting with the interior of cylinder barrel 1403, valve 1454 providing free communication therebetween when spring 1455 is forced back into a fully compressed position. One end of cylinder 1453 communicates with atmospheric pressure through airport 1457 while the opposite end communicates through small metering passage 1458 so that when vacuum is introduced into channel 1452, spring 1455 will compress relatively slowly. A ball check 1459 rides in cylinder barrel 1460 normally seating against port 1461 connecting channel 1452 therewith, pin 1462 preventing seating against port 1463 connecting the interior of cylinder barrel 1403 therewith.

Solenoid assembly 1448 is grounded via terminal 1464, FIG. 33, and is connected directly to the vehicle's grounded generator, 1465 through terminal 1466 and lead 1467. Insert plugs 1417 and 1418 are joined by interconnecting lead 1468 and grounded, while plugs 1419 and 1420 are interconnected by lead 1469 and are joined to the starting motor of the vehicle through lead 1470, the starting motor in turn joined to the grounded battery.

The ignition switch assembly 1416, see FIG. 32, has formed in housing 1415 cylinder bore 1471 opening at one end into ignition switch bearing area 1472, the ignition switch and components thereof not being shown, and at the opposite end into bearing opening 1409 by way of perpendicularly drilled opening 1473. T-headed plunger 1474, riding in opening 1473, is locked behind spring 1475 in encasing, apertured cylinder 1476, the assembly being placed within this area behind spring 1477 through opening 1478 in housing 1415 plugged by threaded insert 1479. Ignition key 1480 is shown to be inserted into ignition switch area 1472, having lifted the wedge-shaped bottom of cylinder 1476 to compress spring 1477 and project the upper end of plunger 1474 into raceway 1427 and in the path of tooth 1428, the flat surface of the perpendicular side of which is shown.

In the operation of the mechanism of FIGS. 31–33 so far described the vacuum cylinder assembly in FIG. 31 is shown to be in a fluidly unpressured condition, spring 1482 having expanded to drive piston ring 1401 and related parts away from end cap 1447 toward end cap 1407, so that the upper end of T-headed plunger 1474 projected into raceway 1427 has come to bear against the flat side of tooth 1428 to hold piston rod 1421 in a neutral position against further expansion, so that shift lever 1436 through the engagement of ball head 1433 on shaft 1429 with hood 1434 has been brought to the neutral position if not already in an out-of-gear position. In FIG. 31 the ignition key 1480 is shown not only to be in the ignition switch which projects under the dash toward the operator to lift T-headed plunger 1474 upwardly, but is also shown to be turned to "off."

If, now the key is turned to "on," the plunger 1474 will remain projected upwardly, since cylinder case 1476 bears upon the rotating axial center line of key 1480. If the operator now grips the shift lever 1436, as shown in FIG. 31, to pull it downwardly into gear, he will find slight angular movement possible between Neutral and Drive wherein shaft 1429 is moved endwardly to compress spring 1432 against the heavier resistance of spring 1482, and to bring electrically conducting ring 1431 into alignment and contact with the inner ends of electrically conducting plugs 1423 and 1424 which are shown (FIG. 31) to be in alignment and contact at their outer ends with electrically conducting plugs 1417 and 1419, thereby completing the starter circuit to start the motor.

As soon as the motor becomes self-operating, vacuum develops within the manifold, and through suitable tubing connection to port 1451 vacuum flows through small restricted port 1458 to pull step-shouldered valve 1454 toward and to compress spring 1455, vacuum at a similarly restricted and reduced rate flowing over the wider shoulder of valve 1454 and through port 1456 to pull piston ring 1401 and related parts at a slow rate toward end cap 1447, providing a yielding action at shift lever 1436 to signal the driver that the motor is running so that he may decide either to release his pressure or continue pulling the lever to an in-gear position. Movement of valve 1454 presently moves the narrow cut of its step-shoulder to a position directly between channel 1452 and port 1456 for unrestricted flow of vacuum and much more rapid movement of ring 1401 for quick, final, and complete compression of spring 1482.

Meanwhile with the restarting of the motor, the generator of the vehicle 1465 begins to provide a current output to pass through solenoid 1448 and to energize core 1449, so that with responsive core 1422 now located within the pulling range of the magnetic lines of force, core 1422 is drawn to and held against core 1449, as shown in FIG. 33. If now the operator suddenly accelerates the motor, especially under load, vacuum pressure will fall noticeably, however piston ring 1401 and related parts will hold the position shown in FIG. 33 until the motor stalls and vacuum as well as current output of the generator disappear. In the position shown in FIG. 33 shaft 1429 can now follow freely and without resistance from spring 1432 to any in-gear position, through positioning of shift lever 1436, which is shown to have already been moved to an in-gear position from the neutral position of FIG. 31.

With the shifting of ring 1401 and related parts to the position shown in FIG. 33, it will be noted that the lower end of shaft 1442 is lifted out of raceway 1426, and range cage 1438 is lifted into the path of tooth 1441, so that with manual shifting to reverse gear position while the motor is operating the shift lever 1436 must be lifted to pivot about pivot points 1437 to clear terrace 1440 to enter reverse gear position, and again must be lifted to pass barrier 1439 to manually enter parking position. However, as soon as the motor stalls or is turned "off," so that piston ring 1401 and related parts move toward end cap 1407, the lower end of shaft 1442 drops into raceway 1426 and range cage 1438 drops from the path of tooth 1441, thereby guaranteeing movement to neutral and park positions, unrestricted by any blocking barriers, excepting plunger 1474, when the motor is stopped and spring 1482 is released for expansion.

In the case the motor now stalls or is stopped through turning of the ignition switch to "off," so that vacuum and the magnetic attraction of solenoid 1448 disappear, normal atmospheric pressure on both sides of piston ring 1401 will allow spring 1482 to expand at a rapid rate and move ring 1401 rapidly toward end cap 1407 as far as abutment of T-headed plunger with tooth 1428, such rapid movement being guaranteed through the unseating of check ball 1459 at the end of port 1461 to by-pass the flow at a reducing rate between channel 1452 and port 1456.

With the assembly back to the position shown in FIG. 31, in the case the operator now withdraws the ignition key 1480 from the lock assembly 1416, spring 1477 expands to drive T-headed plunger 1474 downwardly, breaking the contact with tooth 1428, and permitting spring 1482 to further expand and drive piston ring 1401 with related parts further toward end cap 1407, spring 1432 bearing against the end of shaft 1429 to drive shift lever 1436 into a parking position, so that the vehicle will be locked against movement if the operator should leave, and not remember to set the hand brake.

Since T-headed plunger 1474 now is located at the opposite side of tooth 1428, reinsertion of the key 1480 into lock assembly 1416 lifts the upper end of 1474 into slot 1427 adjacent to the inclined left hand shoulder of tooth 1428. Downward rotational pressure upon the shift lever 1436 causes slight withdrawal of 1474 from slot 1427 while spring 1432 is being compressed. Electrically conducting ring 1431 is long enough to align with the contact plugs 1423 and 1424, and since the latter this time are in alignment and contact with plugs 1418 and 1420, the starter circuit is completed via leads 1468 and 1469 to restart the motor.

Movement of ring 1401 and related parts toward end cap 1447 causes T-headed plunger 1474 to ride the inclined shoulder of tooth 1428 to temporarily compress spring 1475 until tooth 1428 moves from contact with 1474, again allowing spring 1475 to reexpand and block the subsequent return movement of piston ring 1401 and related parts toward end cap 1407 when the motor again has been turned "off" of stalls.

It should be clear from the discussions on the foregoing views that the automatic neutral starter herein described provides two major labor-saving operations for the driver of a motor car, namely, means with which to automatically return the selector lever to desired positions, such as neutral or park, and means manually or automatically to start the motor of the vehicle. It should also be clear that combinations can be made of these means, both manual and automatic, as well as combinations of the manual and automatic intermixed. While the mechanisms herein described exploit a number of such arrangements, it is obvious to and will be understood by those skilled in the art that additional combinations are possible without departing from the spirit or scope of this invention, and that this invention is not intended to be limited to the structures herein shown and described by way of illustration.

I claim:

1. In a vehicle having a motor, the combination of a power transmission adjustable to transmit power and not to transmit power, a movable control member to adjust said transmission, a starter for the motor, a circuit for operating the starter, a key-operated ignition switch, spaced terminals adjacent said switch and in series in said circuit, a control switch in series in said circuit, means responsive to nonoperation of the motor for closing said control switch and for moving said control member to adjust said transmission so that it does not transmit power, and means for closing said terminals while the ignition is turned on including a rotary, current carrying member for bridging said terminals and having a slot therein receiving the key and rotated upon turning of the key in said switch.

2. In a vehicle having a motor, the combination of a power transmission adjustable to transmit power and not to transmit power, a movable control member to adjust said transmission, a starter for the motor, a circuit for operating the starter, a key-operated ignition switch, spaced terminals adjacent said switch and in series in said circuit, a control switch in series in said circuit, means responsive to nonoperation of the motor for closing said control switch and for moving said control member to adjust said transmisison so that it does not transmit pwer, and means for closing said terminals while the ignition is turned on including a rotary, current carrying member for bridging said terminals and having a slot therein receiving the key and rotated upon turning of the key in said switch.

3. In a vehicle having a motor, starter, and an automatic transmission with a shift member movable to a certain position, the combination of a power operated device connected to the member for moving it to said certain position, means for locking the device and thus the member in and out of said certain position, an ignition circuit to control the starter, a manually operated switch for actuating the circuit, and control means for the locking means actuated by movement of the switch.

4. The invention set forth in claim 3 wherein said member is movable to "park" and "neutral" positions and said device moves it to both said positions and wherein said means is capable of locking the device out of either and both said "park" and "neutral" positions.

5. The invention set forth in claim 4 wherein park and reverse positions for said member coincide and said device moves it first to the neutral position and then to the reverse and parking position.

6. In a vehicle having a motor, a starter, and an automatic transmission with a shift member movable to neutral and park positions as well as to various in-gear positions, the combination of a power operated device connected to the member to move it to said positions, means operatively connected to said device and said motor for actuating the device to move the shift member to neutral position when the motor stalls, and means operatively connected to said device and operative upon predetermined conditions for actuating the device to move the shift member to park position.

7. The invention set forth in claim 6 including a circuit for energizing the starter, a switch in said circuit, means for placing said switch in a condition of incipient closing when said shift member is in a neutral or park position, and means whereby manual pressure applied to the shift member in a direction away from the neutral park position closes said switch.

8. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, and hand operated means for putting said device in an inoperative condition wherein it does not move said control member.

9. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving aid control member to a position wherein the transmission does not transmit power, said device being operative to move said control member when the motor is not operating, and governor-operated means for putting said device in an inoperative condition wherein it does not move said control member.

10. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is nt operating, and said device being actuated by above atmospheric pressure in the motor.

11. In a vehicle having a motor, the combination of a power transmisison adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, and said device being solenoid actuated.

12. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, said circuit including a manually operated movable starter switch and said device being connected to and actuated by manual movement of said starter switch.

13. The invention set forth in claim 12 including means for automatically moving said element to break said circuit upon starting of the motor.

14. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, said device being energized upon actuation of the starter.

15. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, and cam means interconnecting the device and the control member.

16. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, said switch being key-operated and said element being moved by movement of the key.

17. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, said vehicle including a flywheel and said starter including a driving member operatively engageable with said flywheel and said device being operatively connected to said pinion to cause it to operatively engage said flywheel when said control member is in a position wherein said transmission does not transmit power.

18. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, said switch element carrying starting current.

19. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, said device also moving said switch element and including hand-operated means for limiting movement of said element and selectively holding it in a position of incipient switch closing.

20. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, said device being operated by vacuum in the motor and including solenoid operated means for holding said device in an inoperative position wherein it does not move said control member and motor speed responsive means for disconnecting the solenoid operated means when the motor speed drops below a predetermined minimum.

21. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, and means for putting said device in an inoperative position wherein it does not move said control member and hand-operated control means for said last mentioned means, said control means being mounted on the dashboard of the vehicle and including releasable means for holding said device in an inoperative position.

22. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, said device being operated by vacuum in the motor and including a vacuum reservoir operatively connected to the device to supply supplemental vacuum during operation of the motor under heavy load.

23. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, said device being actuated by vacuum in the motor and including valve means for cutting off vacuum to the device and motor speed responsive means for controlling said valve means.

24. The invention set for in claim 23 including a vacuum reservoir operatively connected to said device to supply supplemental vacuum during heavy load operation of the motor, said valve means also controlling admission of vacuum to said reservoir.

25. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, and a hand-operated member mounted on the dash for operating said device and wherein said device moves said element to close said circuit.

26. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, said device moving said element to close said circuit and being spring actuated when the motor is not operated, said device including speed responsive governor means for overcoming the spring when the motor is operating.

27. In a vehicle having a motor, the combination of a power transmission adjustable to transmit power and not to transmit power, a movable control member to adjust said transmission, a starter for the motor, a circuit for operating the starter, a switch in said circuit, said switch including a movable element controlling closing of said switch, means interconnecting the element and member so that said element closes said switch only when the member is in a position wherein the transmission does not transmit power, said means including a device automatically moving said control member to a position wherein the transmission does not transmit power, said device being operative to move said control member when the motor is not operating, said switch being operated by movement of the accelerator and including accelerator operated means for putting said device in an inoperative condition wherein it does not move said control member.

References Cited in the file of this patent
UNITED STATES PATENTS

| | | |
|---|---|---|
| 2,328,303 | Simpson | Aug. 31, 1943 |
| 2,529,067 | Bennett et al. | Nov. 7, 1950 |
| 2,599,724 | Russell | June 10, 1952 |
| 2,661,730 | Schneider et al. | Dec. 8, 1953 |
| 2,725,864 | Coffey et al. | Dec. 6, 1955 |
| 3,035,563 | Strauss | May 22, 1962 |